US012769000B2

(12) United States Patent
Nakagome et al.

(10) Patent No.: US 12,769,000 B2
(45) Date of Patent: Oct. 20, 2026

(54) RANGE IMAGING DEVICE AND RANGE IMAGING METHOD

(71) Applicant: TOPPAN Inc., Tokyo (JP)

(72) Inventors: Tomohiro Nakagome, Taito-ku (JP); Yu Ookubo, Taito-ku (JP); Satoshi Takahashi, Taito-ku (JP); Hiroshige Goto, Yokohama (JP)

(73) Assignee: TOPPAN Inc., Tokyo (JP)

( * ) Notice: Subject to any disclaimer, the term of this patent is extended or adjusted under 35 U.S.C. 154(b) by 565 days.

(21) Appl. No.: 18/357,546

(22) Filed: Jul. 24, 2023

(65) Prior Publication Data

US 2023/0367018 A1 Nov. 16, 2023

Related U.S. Application Data

(63) Continuation of application No. PCT/JP2022/002581, filed on Jan. 25, 2022.

(30) Foreign Application Priority Data

Jan. 25, 2021 (JP) ................................ 2021-009673

(51) Int. Cl.
*G01C 3/08* (2006.01)
*G01S 7/4865* (2020.01)
(Continued)

(52) U.S. Cl.
CPC .......... *G01S 17/894* (2020.01); *G01S 7/4865* (2013.01); *G01S 17/10* (2013.01)

(58) Field of Classification Search
CPC ....... G01S 17/894; G01S 17/10; G01S 7/4865
See application file for complete search history.

(56) References Cited

U.S. PATENT DOCUMENTS

2018/0329063 A1 11/2018 Takemoto et al.
2020/0278194 A1 9/2020 Kawahito
(Continued)

FOREIGN PATENT DOCUMENTS

CN 107850664 A * 3/2018 ............ G01S 7/497
JP 4235729 B 3/2009
(Continued)

OTHER PUBLICATIONS

Japanese Office Action issued on Oct. 1, 2024 in Japanese Patent Application No. 2021-009673 (with English translation), 9 pages.
(Continued)

*Primary Examiner* — Mark Hellner
(74) *Attorney, Agent, or Firm* — Oblon, McClelland, Maier & Neustadt, L.L.P.

(57) ABSTRACT

A range imaging device includes a light source unit, a light-receiving unit, and a range image processing unit that computes a distance to an object. The range image processing unit performs multiple measurements different in relative timing relationship between an emission timing and an accumulation timing, extracts a feature amount based on the amounts of charge accumulated at the measurements, determines whether reflection light of a light pulse has been received by pixels in a single path or via multipath propagation, based on tendency of the extracted feature amount, and calculates the distance to the object present in a measurement space in accordance with a result of the determination.

19 Claims, 11 Drawing Sheets

(51) Int. Cl.
*G01S 17/10* (2020.01)
*G01S 17/894* (2020.01)

(56) References Cited

U.S. PATENT DOCUMENTS

| | | | | |
|---|---|---|---|---|
| 2020/0382736 | A1 | 12/2020 | Na et al. | |
| 2021/0231783 | A1 * | 7/2021 | Ito | G01S 7/497 |
| 2023/0236322 | A1 * | 7/2023 | Lei | H10F 39/812 356/4.01 |

FOREIGN PATENT DOCUMENTS

| | | | | |
|---|---|---|---|---|
| WO | WO 2017/138032 A1 | | 8/2017 | |
| WO | WO 20170138032 A1 | * | 8/2017 | G01S 7/497 |
| WO | WO 2019/078366 A1 | | 4/2019 | |
| WO | WO 2019/188348 A1 | | 10/2019 | |

OTHER PUBLICATIONS

Extended European Search Report issued Jun. 21, 2024 in European Patent Application No. 22742722.6, 9 pages.

International Search Report issued Mar. 29, 2022 in PCT/JP2022/002581, filed Jan. 25, 2022, 5 pages.

* cited by examiner

RANGE IMAGING DEVICE AND RANGE IMAGING METHOD

CROSS-REFERENCE TO RELATED APPLICATIONS

The present application is a continuation of and claims the benefit of priority to International Application No. PCT/JP2022/002581, filed Jan. 25, 2022, which is based upon and claims the benefit of priority to Japanese Application No. 2021-009673, filed Jan. 25, 2021. The entire contents of these applications are incorporated herein by reference.

BACKGROUND OF THE INVENTION

Field of the Invention

The present disclosure relates to range imaging devices and range imaging methods.

DESCRIPTION OF BACKGROUND ART

JP 4235729 B describes a technique for calculating a distance by distributing and accumulating charge according to received light in three charge accumulation units provided in one pixel. The entire contents of this publication are incorporated herein by reference.

SUMMARY OF THE INVENTION

According to one aspect of the present invention, a range imaging device includes a light source that emits a light pulse to a measurement space of a measurement target, a light-receiving unit including a pixel drive circuit that distributes and accumulates charge in three or more charge accumulation units at a timing synchronized with emission of the light pulse, and a pixel including a photoelectric conversion element that generates the charge in accordance with incident light and the charge accumulation units that accumulates the charge, and a range image processing unit including circuitry that controls an emission timing for emitting the light pulse and an accumulation timing for distributing and accumulating the charge in the charge accumulation units, and calculates a distance to an object in the measurement space based on amounts of charge accumulated in the charge accumulation units. The circuitry of the range image processing unit performs measurements different in relative timing relationship between the emission timing and the accumulation timing, extracts a feature amount based on the amounts of charge accumulated at the measurements, determines, based on tendency of the extracted feature amount, whether reflection light of the light pulse is received by the pixel in a single path or the reflection light of the light pulse is received by the pixel via multipath propagation and calculates the distance to the object in the measurement space in accordance with a result of the determination.

According to another aspect of the present invention, a range imaging method executed by a range imaging device includes emitting a light pulse to a measurement space of a measurement target by a light source of the range imaging device, generating charge in accordance with incident light by a photoelectric conversion element in a pixel of a light receiving unit in the range imaging device, distributing and accumulating the charge in three or more charge accumulation units in the pixel of the light receiving unit in the range imaging device at a timing synchronized with the emission of the light pulse by a pixel drive circuit of the light receiving unit in the range imaging device, and controlling an emission timing for emitting the light pulse and an accumulation timing for distributing and accumulating the charge in the charge accumulation units such that a distance to an object in the measurement space is calculated based on amounts of charge accumulated in the charge accumulation units by a range image processing unit of the range imaging device. The controlling by the range image processing unit include performing measurements different in relative timing relationship between the emission timing and the accumulation timing, extracting a feature amount based on the amounts of charge accumulated at the measurements, determining, based on tendency of the extracted feature amount, whether reflection light of the light pulse is received by the pixel in a single path or the reflection light of the light pulse is received by the pixel via multipath propagation, and calculating the distance to the object in the measurement space in accordance with a result of the determination.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
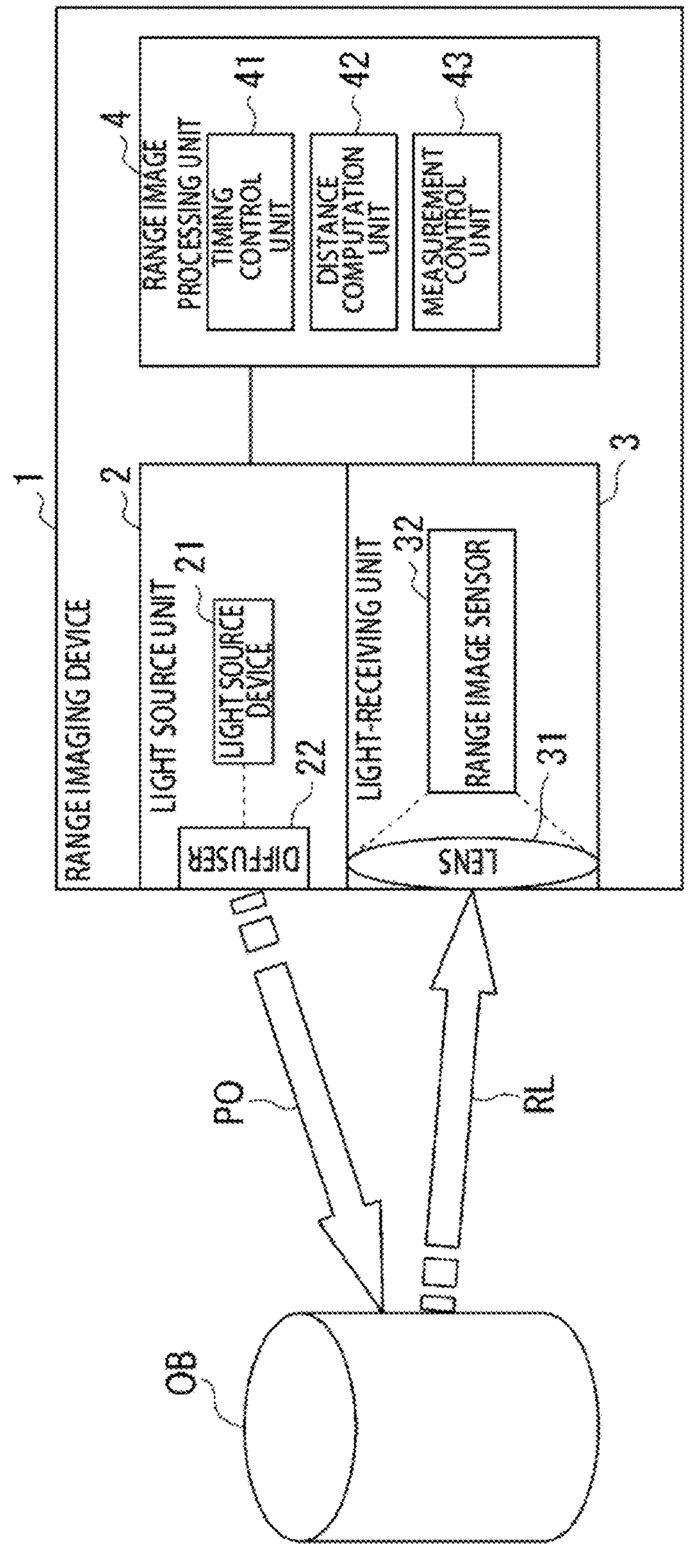
FIG. 1 is a block diagram illustrating a schematic configuration of a range imaging device according to an embodiment of the present invention.

Embodiments will now be described with reference to the accompanying drawings, wherein like reference numerals designate corresponding or identical elements throughout the various drawings.

Hereinafter, a range imaging device in an embodiment will be described with reference to the drawings.

EMBODIMENT

First, an embodiment will be described. FIG. 1 is a block diagram illustrating a schematic configuration of a range imaging device in an embodiment of the present disclosure. A range imaging device 1 shown in FIG. 1 includes a light source unit 2, a light-receiving unit 3, and a range image processing unit 4. FIG. 1 also illustrates an object OB that is a target object to which the distance is to be measured by the range imaging device 1.

The light source unit 2 emits a light pulse PO to a measurement target space where there exists the object OB to which the distance is to be measured by the range imaging device 1, under the control of the range image processing unit 4. The light source unit 2 is a surface emitting semiconductor laser module such as a vertical cavity surface emitting laser (VCSEL). The light source unit 2 includes a light source device 21 and a diffuser 22.

The light source device 21 is a light source that emits laser light in a near-infrared wavelength band (for example, a wavelength band with wavelengths of 850 nm to 940 nm) that is to be the light pulse PO emitted to the object OB. The light source device 21 is a semiconductor laser light emitting element, for example. The light source device 21 emits pulsed laser light under the control of a timing control unit 41.

The diffuser 22 is an optical component that diffuses the laser light in the near-infrared wavelength band emitted by the light source device 21 to the spread of a plane in accordance with emission to the object OB. The pulsed laser light diffused by the diffuser 22 is emitted as the light pulse PO and applied to the object OB.

The light-receiving unit 3 receives reflection light RL of the light pulse PO from the object OB to which the distance is to be measured by the range imaging device 1, and outputs a pixel signal in accordance with the received reflection light RL. The light-receiving unit 3 includes a lens 31 and a range image sensor 32.

The lens 31 is an optical lens that guides the incident reflection light RL to the range image sensor 32. The lens 31 emits the incident reflection light RL toward the range image sensor 32 so as to be received (incident) on the pixels included in the light-receiving region of the range image sensor 32.

The range image sensor 32 is an imaging element that is used in the range imaging device 1. The range image sensor 32 includes multiple pixels in a two-dimensional light-receiving region. Each of the pixels in the range image sensor 32 is provided with a photoelectric conversion element, multiple charge accumulation units corresponding to the photoelectric conversion element, and a component that distributes charge to the charge accumulation units. That is, the pixels are imaging elements of a distributing configuration that distribute and accumulate charge in the charge accumulation units.

The range image sensor 32 distributes the charge generated by the photoelectric conversion element to the charge accumulation units under the control of the timing control unit 41. The range image sensor 32 outputs pixel signals corresponding to the amounts of charge distributed to the charge accumulation units. The range image sensor 32 has multiple pixels formed in a two-dimensional matrix and outputs pixel signals of each frame (each frame period) corresponding to the pixels.

The range image processing unit 4 controls the range imaging device 1 to calculate the distance to the object OB. The range image processing unit 4 includes a timing control unit 41, a distance computation unit 42, and a measurement control unit 43.

The timing control unit 41 controls timings for outputting various control signals required for measurement under the control of the measurement control unit 43. The various control signals include a signal for controlling the emission of the light pulse PO, a signal for distributing the reflection light RL to the charge accumulation units, a signal for controlling the number of distributions in each frame (the number of accumulations), and others, for example. The number of distributions (the number of accumulations) refers to the number of iterations for which a process of distributing the charge to the charge accumulation units CS (see FIG. 3) is repeated. The product of the number of distributions and the duration during which charge is accumulated in each of the charge accumulation units in one process of distributing the charge (accumulation time Ta described later) indicates an exposure time.

Based on the pixel signals output from the range image sensor 32, the distance computation unit 42 outputs distance information obtained by computing the distance to the object OB. Based on the amounts of charge accumulated in the charge accumulation units, the distance computation unit 42 calculates a delay time Td from the emission of the light pulse PO to the receipt of the reflection light RL (see FIG. 4). The distance computation unit 42 computes the distance to the object OB in accordance with the calculated delay time Td.

The measurement control unit 43 controls the timing control unit 41. For example, the measurement control unit 43 sets the number of distributions in each frame and the accumulation time Ta (see FIG. 4), and controls the timing control unit 41 such that image capturing is performed at the settings.

According to this configuration, in the range imaging device 1, the light source unit 2 emits the light pulse PO in the near-infrared wavelength band to the object OB, the light-receiving unit 3 receives the reflection light RL of the light pulse PO from the object OB, and the range image processing unit 4 outputs the distance information obtained by measuring the distance to the object OB.

FIG. 1 illustrates the range imaging device 1 that includes therein the range image processing unit 4. However, the range image processing unit 4 may be a component that is provided outside of the range imaging device 1.

Figure 2:
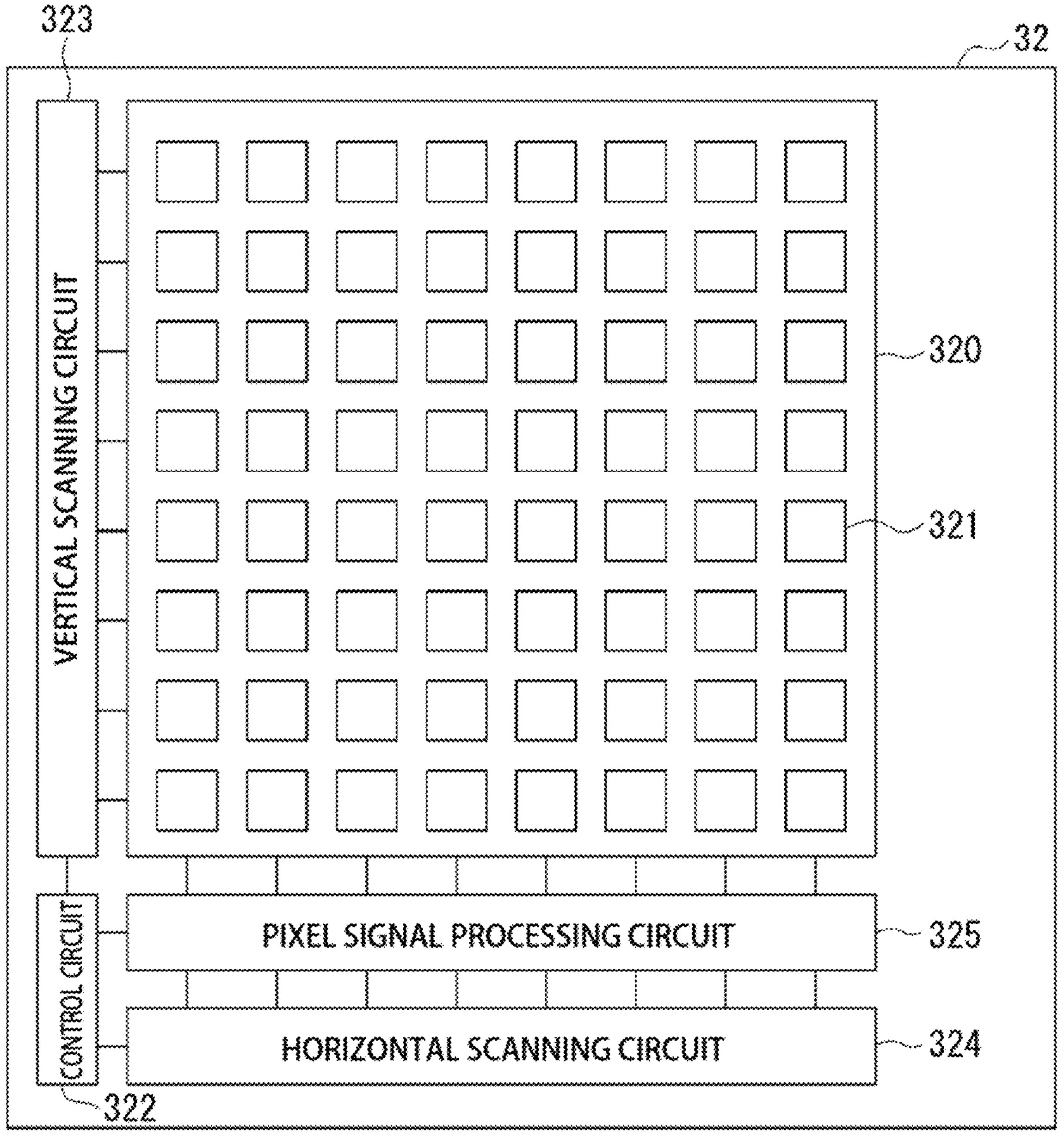
FIG. 2 is a block diagram illustrating a schematic configuration of a range image sensor according to an embodiment of the present invention.

Next, a configuration of the range image sensor 32 that is used as an imaging element in the range imaging device 1 will be described. FIG. 2 is a block diagram illustrating a schematic configuration of the imaging element (the range image sensor 32) used in the range imaging device 1 in the embodiment of the present disclosure.

As illustrated in FIG. 2, the range image sensor 32 includes a light-receiving region 320 in which multiple pixels 321 is formed, a control circuit 322, a vertical scanning circuit 323 that performs a distributing operation, a horizontal scanning circuit 324, and a pixel signal processing circuit 325, for example.

The light-receiving region 320 is a region in which the pixels 321 is formed. FIG. 2 illustrates an example in which the pixels 321 are formed in a two-dimensional eight-by-eight matrix. The pixels 321 accumulate charge corresponding to the amount of received light. The control circuit 322 exerts overall control of the range image sensor 32. The control circuit 322 controls operations of components of the range image sensor 32 in response to instructions from the timing control unit 41 of the range image processing unit 4, for example. The components included in the range image sensor 32 may be directly controlled by the timing control unit 41. In this case, the control circuit 322 may be omitted.

The vertical scanning circuit 323 is a circuit that controls the pixels 321 formed in the light-receiving region 320 row by row, under the control of the control circuit 322. The vertical scanning circuit 323 causes the pixel signal processing circuit 325 to output voltage signals corresponding to the amounts of charge accumulated in the charge accumulation units CS of the pixels 321. In this case, the vertical scanning circuit 323 distributes the charge converted by the photoelectric conversion element to the charge accumulation units of the pixels 321. That is, the vertical scanning circuit 323 is an example of a "pixel drive circuit".

The pixel signal processing circuit 325 is a circuit that performs a predetermined signal process (for example, noise suppression, A/D conversion, or the like) on the voltage signals output from the pixels 321 in the individual columns to the corresponding vertical signal lines under the control of the control circuit 322.

The horizontal scanning circuit 324 is a circuit that causes the pixel signal processing circuit 325 to output the signals in sequence to the horizontal signal lines under the control of the control circuit 322. Accordingly, the pixel signals corresponding to the amount of charge accumulated in each frame are output in sequence to the range image processing unit 4 through the horizontal signal lines.

The following description is based on the assumption that the pixel signal processing circuit 325 performs the A/D conversion process and the pixel signals are digital signals.

Figure 3:
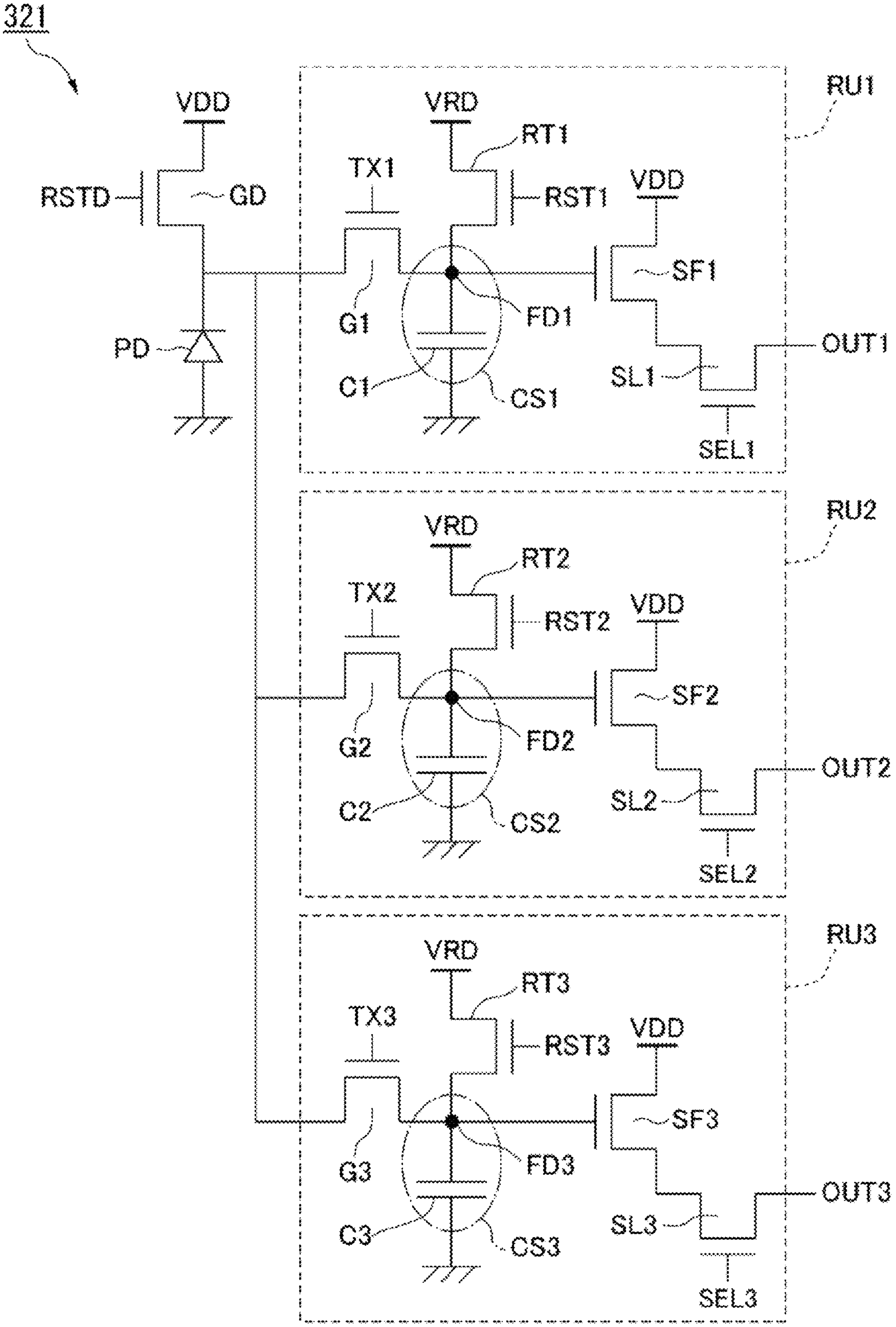
FIG. 3 is a circuit diagram illustrating an example of a configuration of a pixel according to an embodiment of the present invention.

A configuration of each pixel 321 formed in the light-receiving region 320 included in the range image sensor 32 will be described. FIG. 3 is a circuit diagram illustrating an example of a configuration of each pixel 321 formed in the light-receiving region 320 of the range image sensor 32 in the embodiment. FIG. 3 illustrates an example of a configuration of one pixel 321 among the pixels 321 formed in the light-receiving region 320. Each pixel 321 is an example of a component including three pixel signal read units.

Each pixel 321 includes a photoelectric conversion element PD, a drain-gate transistor GD, and three pixel signal read units RU that output voltage signals from corresponding output terminals OUT.

Each of the pixel signal read units RU includes a read gate transistor G, a floating diffusion FD, a charge accumulation capacitor C, a reset gate transistor RT, a source-follower gate transistor SF, and a selection gate transistor SL. In each of the pixel signal read units RU, the floating diffusion FD and the charge accumulation capacitor C constitute the charge accumulation unit CS.

In FIG. 3, the number "1", "2", or "3" is appended to the reference numeral "RU" of the three pixel signal read units RU to differentiate these pixel signal read units RU from one another. Similarly, as for the components included in the three pixel signal read units RU, the numbers indicating the corresponding pixel signal read units RU are appended to the reference numerals to differentiate the pixel signal read units RU corresponding to the components from one another.

In the pixel 321 illustrated in FIG. 3, a pixel signal read unit RU1 outputs a voltage signal from an output terminal OUT1, and includes a read gate transistor G1, a floating diffusion FD1, a charge accumulation capacitor C1, a reset gate transistor RT1, a source-follower gate transistor SF1, and a selection gate transistor SL1. In the pixel signal read unit RU1, the floating diffusion FD1 and the charge accumulation capacitor C1 constitute a charge accumulation unit CS1. A pixel signal read unit RU2 and a pixel signal read unit RU3 are similarly configured. The charge accumulation unit CS1 is an example of a "first charge accumulation unit". A charge accumulation unit CS2 is an example of a "second charge accumulation unit". A charge accumulation unit CS3 is an example of a "third charge accumulation unit".

The photoelectric conversion element PD is an embedded photodiode that subjects incident light to photoelectric conversion to generate charge and accumulates the generated charge. The photoelectric conversion element PD may be structured in any manner. The photoelectric conversion element PD may be a PN photodiode in which a P-type semiconductor and an N-type semiconductor are joined, or may be a PIN photodiode in which an I-type semiconductor is sandwiched between a P-type semiconductor and an N-type semiconductor. The photoelectric conversion element PD is not limited to a photodiode and may be a photogate-type photoelectric conversion element, for example.

In each pixel 321, incident light is subjected to photoelectric conversion by the photoelectric conversion element PD to generate the charge, and the generated charge is distributed to the three charge accumulation units CS, and voltage signals corresponding to the amounts of distributed charge are outputs to the pixel signal processing circuit 325.

The configuration of each pixel formed in the range image sensor 32 is not limited to the configuration including the three pixel signal read units RU as illustrated in FIG. 3, and may be a configuration of a pixel that simply includes multiple pixel signal read units. That is, the number of pixel signal read units RU (the charge accumulation units CS) included in each pixel formed in the range image sensor 32 may be four or more.

In the pixel 321 of the configuration illustrated in FIG. 3, each charge accumulation unit CS is formed by the floating diffusion FD and the charge accumulation capacitor C as an example. However, the charge accumulation unit CS may be formed by at least the floating diffusion FD, and each pixel 321 may not include the charge accumulation capacitor C.

Each pixel 321 of the configuration illustrated in FIG. 3 includes the drain-gate transistor GD as an example. However, if it is not necessary to discard the charge accumulated (remained) in the photoelectric conversion element PD, each pixel 321 may not include the drain-gate transistor GD.

Figure 4:
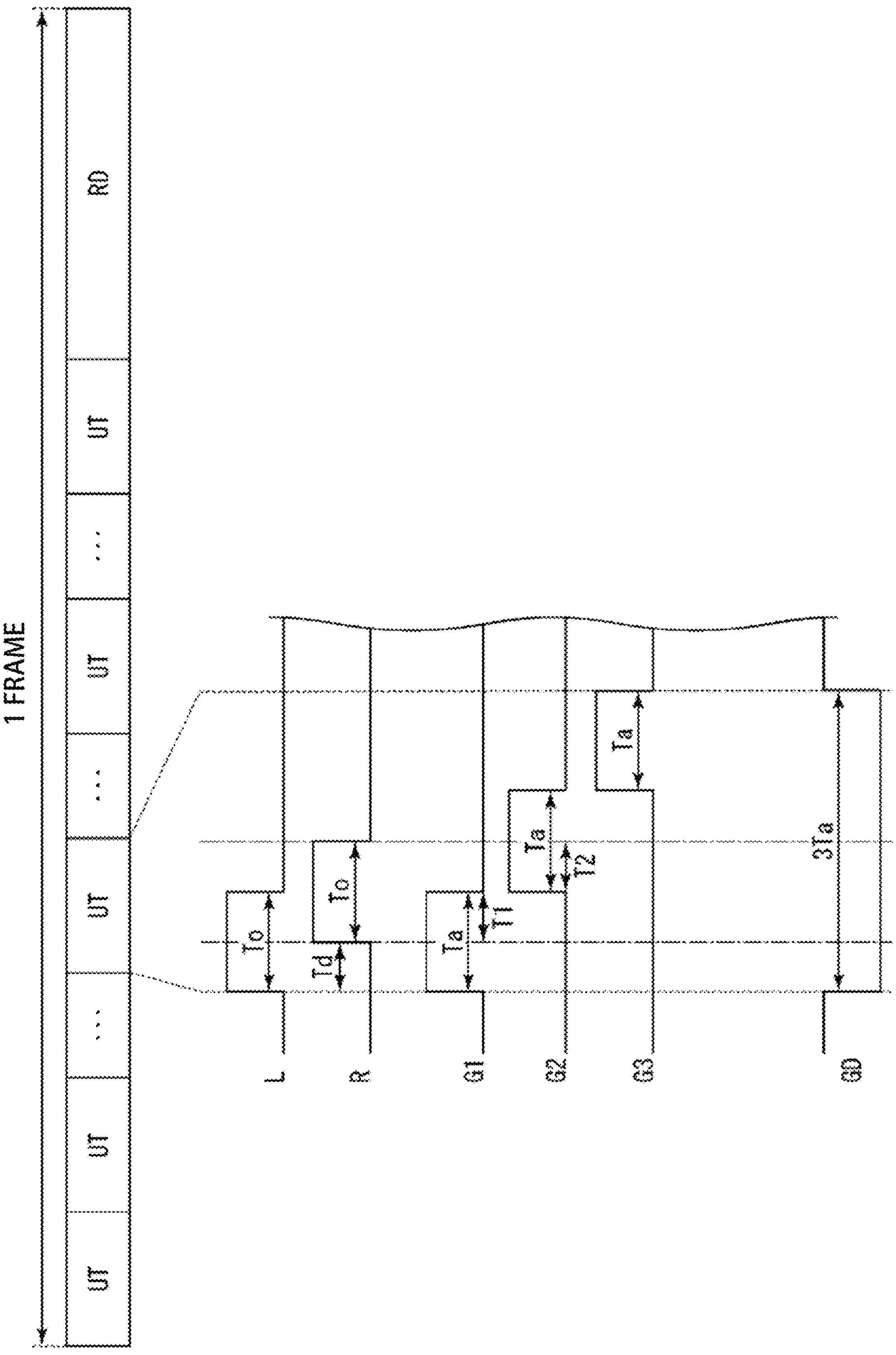
FIG. 4 is a timing chart showing timings for driving a pixel according to an embodiment of the present invention.

Next, timings for driving each pixel 321 in the embodiment will be described with reference to FIG. 4. FIG. 4 is a timing chart indicating timings for driving each pixel 321 in the embodiment. FIG. 4 is a timing chart of the pixel that receives reflection light after a lapse of the delay time Td from the emission of the light pulse PO.

FIG. 4 represents, using symbols, the timing for emitting the light pulse PO as "L", the timing for receiving the reflection light as "R", the timing for a drive signal TX1 as "G1", the timing for a drive signal TX2 as "G2", the timing for a drive signal TX3 as "G3", and the timing for a drive signal RSTD as "GD". The drive signal TX1 is a signal for driving the read gate transistor G1. Similar correspondence applies to the drive signals TX2 and TX3.

As illustrated in FIG. 4, the light pulse PO is emitted for an emission time To, and the reflection light RL is received by the range image sensor 32 with a delay of the delay time Td. The vertical scanning circuit 323 causes the charge accumulation units CS1, CS2, and CS3 to accumulate charge in this order in synchronization with the emission of the light pulse PO. In FIG. 4, in one distribution process, the times from the emission of the light pulse PO to the sequential accumulation of charge in the charge accumulation units CS are denoted as unit accumulation time UT.

As illustrated in FIG. 4, the vertical scanning circuit 323 turns off the drain-gate transistor GD and turns on the read gate transistor G1 in synchronization with the timing for emitting the light pulse PO. After a lapse of the accumulation time Ta from the turn-on of the read gate transistor G1, the vertical scanning circuit 323 turns off the read gate transistor G1. Accordingly, the charge, having undergone photoelectric conversion by the photoelectric conversion element PD while the read gate transistor G1 is controlled in the on state, is accumulated in the charge accumulation unit CS1 via the read gate transistor G1.

Next, at the timing of turning off the read gate transistor G1, the vertical scanning circuit 323 turns on a read gate transistor G2 and sets the read gate transistor G2 in the on state for the accumulation time Ta. Accordingly, the charge, having undergone photoelectric conversion by the photoelectric conversion element PD while the read gate transistor G2 is controlled in the on state, is accumulated in the charge accumulation unit CS2 via the read gate transistor G2.

Next, at the timing of ending the accumulation of the charge in the charge accumulation unit CS2, the vertical scanning circuit 323 turns on a read gate transistor G3. After a lapse of the accumulation time Ta, the vertical scanning circuit 323 turns off the read gate transistor G3. Accordingly, the charge, having undergone photoelectric conversion by the photoelectric conversion element PD while the read gate transistor G3 is controlled in the on state, is accumulated in the charge accumulation unit CS3 via the read gate transistor G3.

Next, at the timing of ending the accumulation of charge in the charge accumulation unit CS3, the vertical scanning circuit 323 turns on the drain-gate transistor GD to discharge the charge. Accordingly, the charge, having undergone photoelectric conversion by the photoelectric conversion element PD, is discarded via the drain-gate transistor GD.

As described above, in the embodiment, control is performed such that the charge having undergone photoelectric conversion are not accumulated at timings outside the time interval in the unit accumulation time UT during which the charge is accumulated in the charge accumulation units CS. This is a short-pulse method (hereinafter, called SP method) by which the light pulse PO is intermittently emitted in the embodiment. In the SP method, in the unit accumulation time UT, the drain-gate transistor GD is turned on to discharge the charge in the time interval during which the reflection light RL is not supposed to be received. Accordingly, it is possible to avoid the charge corresponding to an external light component from being continuously accumulated in the time interval during which the reflection light RL of the light pulse PO is not supposed to be received.

On the other hand, in a continuous wave method (hereinafter, CW method) in which the light pulse PO is continuously emitted, the charge is not discharged each time the charge is accumulated in the charge accumulation units CS in the unit accumulation time UT. This is because, in the CW method, the reflection light RL is received at any time and there is no time interval during which the reflection light RL is not supposed to be received. In the CW method, in the time interval during which the unit accumulation time UT is repeated multiple times in each frame, the discharging unit such as a reset gate transistor connected to the photoelectric conversion element PD is controlled in the off state so as not to discharge the charge. When the read time RD arrives in each frame, the amounts of charge accumulated in the charge accumulation units CS are read, and then the discharging unit such as a reset gate transistor is controlled in the on state to discharge the charge. In the above description, the discharging unit is connected to the photoelectric conversion element PD as an example. However, the present disclosure is not limited to this configuration. The photoelectric conversion element PD may not have the discharging unit, and a reset gate transistor in which the discharging unit is connected to the floating diffusion FD may be used instead.

In the present embodiment, control is performed such that the charge having undergone photoelectric conversion at a time interval different from the time interval during which the charge is accumulated in the charge accumulation units CS in the unit accumulation time UT are discharged by the drain-gate transistor GD (an example of a "discharging unit"). Accordingly, even if an error occurs in the amounts of charge accumulated in the charge accumulation units CS resulting from a delay in charge transfer or the like, it is possible to reduce the error as compared to the case in which the charge is not discharged in each unit accumulation time UT as in the CW method.

In the present embodiment, since the SP method is employed, each pixel 321 in the range imaging device 1 includes the drain-gate transistor GD. This reduces the error as compared to the case in which the charge is continuously accumulated in each frame by the CW method, so that the SN ratio of the amount of charge (the ratio of error to signal component) can be increased. Therefore, errors are unlikely to be integrated even if the number of accumulations is increased, whereby it is possible to maintain the accuracy of the amounts of charge accumulated in the charge accumulation units CS and calculate the feature amount with accuracy.

The vertical scanning circuit 323 repeatedly performs the driving operation as described above for a predetermined number of distribution counts in each frame. After that, the vertical scanning circuit 323 outputs voltage signals corresponding to the amounts of charge distributed to the charge accumulation units CS. Specifically, the vertical scanning circuit 323 sets the selection gate transistor SL1 in the on state for a predetermined period of time to cause the output terminal OUT1 to output a voltage signal corresponding to the amount of charge accumulated in the charge accumulation unit CS1 via the pixel signal read unit RU1. Similarly, the vertical scanning circuit 323 turns on the selection gate transistors SL2 and SL3 in sequence to cause the output terminals OUT2 and OUT3 to output voltage signals corresponding to the amounts of charge accumulated in the charge accumulation units CS2 and CS3. Then, the electric signals corresponding to the amounts of charge for each frame accumulated in the charge accumulation units CS are output to the distance computation unit 42 via the pixel signal processing circuit 325 and the horizontal scanning circuit 324.

In the example described above, the light source unit 2 emits the light pulse PO at the timing when the read gate transistor G1 turns on. However, the present disclosure is not limited to this. The light pulse PO may be emitted at least at a timing when the reflection light RL from a measurement target object is received by any two of the three charge accumulation units CS1 to CS3. For example, the light pulse PO may be emitted after the read gate transistor G1 turns on. In the example described above, the length of the emission time To during which the light pulse PO is emitted is the same as the length of the accumulation time Ta. However, the present disclosure is not limited to this. The emission time To and the accumulation time Ta may be different in duration.

In the short-distance light-receiving pixel as illustrated in FIG. 4, the charge corresponding to the reflection light RL and the external light component is distributed and held in the charge accumulation units CS1 and CS2 from the relation between the timing for emitting the light pulse PO and the timing for accumulating the charge in each of the charge accumulation units CS. The charge corresponding to the external light component such as background light is held in the charge accumulation unit CS3. The allocation (distributing ratio) of charge distributed to the charge accumulation units CS1 and CS2 is the ratio in accordance with the delay time Td from the reflection of the light pulse PO on the object OB to the entry of the light pulse PO into the range imaging device 1.

The distance computation unit 42 utilizes this principle to calculate the delay time Td by Equation (1) below in a conventional short-distance light-receiving pixel. Equation (1) is based on the precondition that the amount of charge corresponding to the external light component among the amounts of charge accumulated in each of the charge accumulation units CS1 and CS2 is the same as the amount of charge accumulated in the charge accumulation unit CS3.

$$Td=To\times(Q2-Q3)/(Q1+Q2-2\times Q3) \quad \text{Equation (1)}$$

where To is the period of time during which the light pulse PO is emitted;

Q1 is the amount of charge accumulated in the charge accumulation unit CS1;

Q2 is the amount of charge accumulated in the charge accumulation unit CS2; and

Q3 is the amount of charge accumulated in the charge accumulation unit CS3.

The distance computation unit 42 multiplies the delay time Td determined in Equation (1) by the speed of light (speed) in the short-distance light-receiving pixel to calculate the distance by which the light propagates to and returns from the object OB. The distance computation unit 42 then halves the calculated to-and-fro distance to determine the distance to the object OB.

Figure 5:
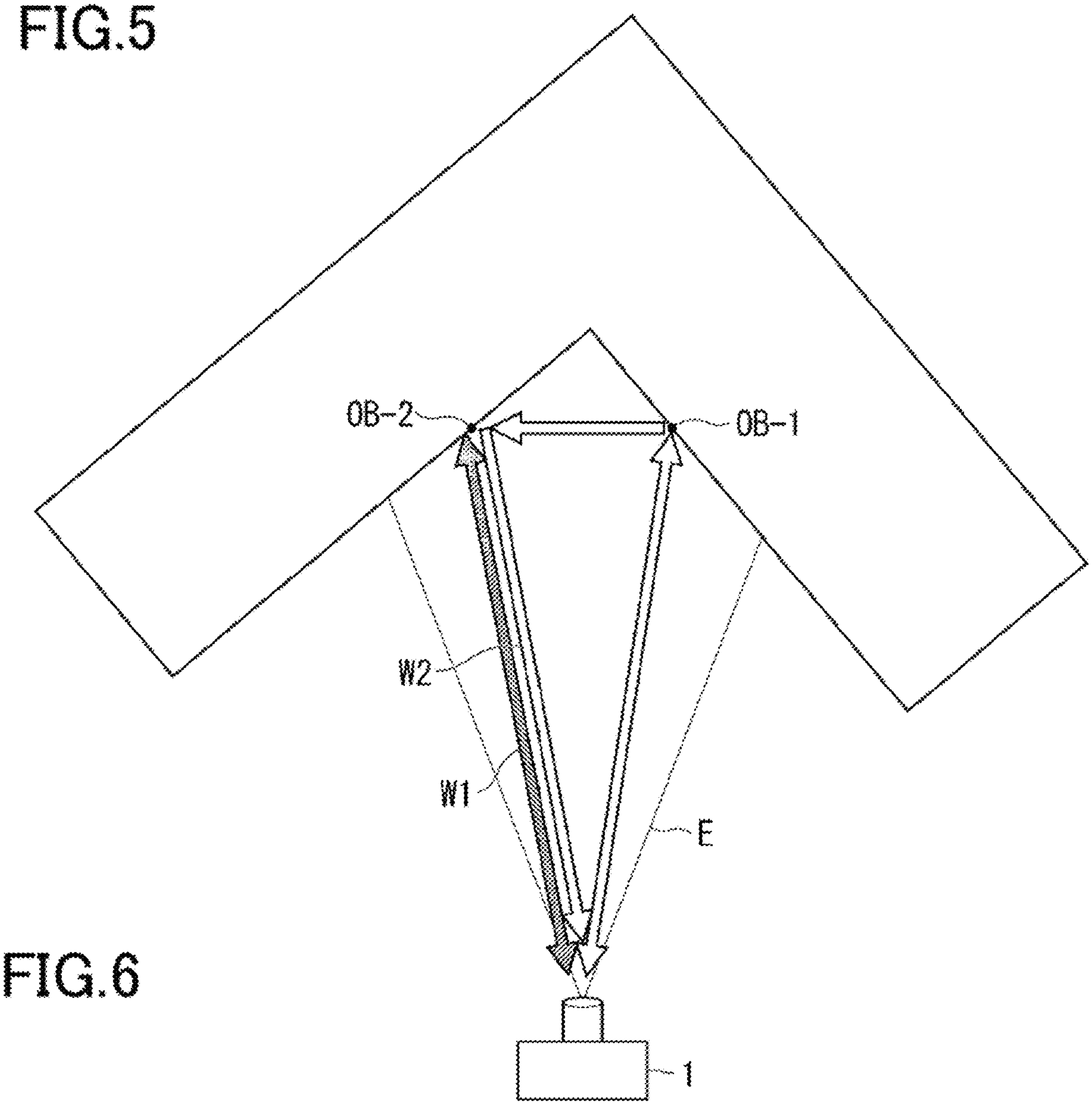
FIG. 5 is a diagram describing multipath propagation according to an embodiment of the present invention.

Next, multipath propagation in the embodiment will be described with reference to FIG. 5. FIG. 5 is a diagram describing multipath propagation in the embodiment. The range imaging device 1 uses a light source wider in radiation range than a light detection and ranging (Lidar) and the like. This has an advantage that measurement can be performed in a certain size of space at a time, but has a disadvantage that multipath propagation is likely to occur. In the schematically shown example of FIG. 5, the range imaging device 1 emits the light pulse PO to a measurement space E and receives multiple reflection waves (multipath propagation), a direct wave W1 and an indirect wave W2. In the following description, multipath propagation formed of two reflection waves will be taken as an example. However, the present disclosure is not limited to this. The multipath propagation may be formed of three or more reflection waves. Even if the multipath propagation is formed of three or more reflection waves, the method described below can also be applied.

In the case of receiving light via multipath propagation, the shape (time-series change) of reflection waves received by the range imaging device 1 is different from the shape of the reflection wave in the case of receiving light in a single path.

For example, in the case of a single path, the range imaging device 1 receives reflection light (direct wave W1) of the same shape as the light pulse, with a delay of the delay time Td. In contrast to this, in the case of multipath propagation, the range imaging device 1 receives a direct wave plus reflection light (indirect wave W2) of the same shape as the light pulse with a delay of the delay time Td+α. The sign a refers to the time by which the indirect wave W2 is delayed relative to the direct wave W1. That is, in the case of multipath propagation, the range imaging device 1 receives multiple rays of light with the same shape as the light pulse in a summed state with a time difference.

That is, the reflection light is different in shape (time-series change) between multipath propagation and single path. Equation (1) described above is an equation based on the precondition that the delay time is a time necessary for the light pulse to reciprocate directly between the light source and the object. That is, Equation (1) is based on the precondition that the range imaging device 1 receives light in a single path. Thus, if the range imaging device 1 receives light via multipath propagation and calculates the distance using Equation (1), the calculated distance will be a non-physical distance that does not correspond to the position of any reflecting body. Accordingly, the difference between the calculated distance (measured distance) and the real distance may become large and cause an error, for example.

As a countermeasure against this problem, in the present embodiment, the range imaging device 1 determines whether light has been received in a single path or via multipath propagation and computes the distance according to the determination result. For example, if the range imaging device 1 has received light in a single path, the range imaging device 1 calculates the distance using a relational expression based on a single reflecting body, for example, Equation (1). If the range imaging device 1 has received light via multipath propagation, the range imaging device 1 calculates the distance by another means without using Equation (1). Accordingly, the calculated distance will surely be a distance corresponding to the position of the reflecting body or a physically reasonable distance that corresponds to multiple positions. This makes it possible to reduce errors in the measured distance.

A method for determining whether the range imaging device 1 has received light in a single path or via multipath propagation will be described. The range imaging device 1 extracts the feature amount of the amounts of charge accumulated in the three charge accumulation units CS included in each pixel 321. Then, the range imaging device 1 determines whether the pixel 321 has received light in a single path or via multipath propagation according to the tendency of the extracted feature amount.

Specifically, the range image processing unit 4 calculates a complex variable CP shown in Equation (2) below, based on the amounts of charge accumulated in the charge accumulation units CS. The complex variable CP is an example of "feature amount".

$$CP=(Q1-Q2)+j(Q2-Q3) \quad \text{Equation (2)}$$

where j is the imaginary unit;

Q1 is the amount of charge accumulated in the charge accumulation unit CS1 (first charge amount);

Q2 is the amount of charge accumulated in the charge accumulation unit CS2 (second charge amount); and Q3 is the amount of charge accumulated in the charge accumulation unit CS3 (third charge amount).

The range image processing unit 4 provides the complex variable CP shown in Equation (2) as a function GF of a phase ($2\pi f\tau_A$) using Equation (3). The phase ($2\pi f\tau_A$) here represents a delay time $\tau_A$ relative to the timing for emitting the light pulse PO by a phase delay relative to the period of the light pulse PO (1/f=2To). Equation (3) is based on the precondition that only the reflection light from an object $OB_A$ at a distance $L_A$ has been received, that is, light has been received in a single path. The function GF is an example of "feature amount".

$$CP=D_A\times GF(2\pi f\tau_A) \quad \text{Equation (3)}$$

where $D_A$ is the intensity (constant) of the reflection light from the object $OB_A$ at the distance $L_A$;

$\tau_A$ is the time for the light to go to and return from the object $OB_A$ at the distance $L_A$;

$\tau_A=2L_A/c$; and c is the speed of light.

If the values of the function GF corresponding to the phases 0 to $2\pi$ can be determined in Equation (3), it is possible to prescribe all the single paths in which the range imaging device 1 can receive light. Thus, the range image processing unit 4 defines a complex function CP(φ) of a phase φ for the complex variable CP shown in Equation (3), and represents the same as shown in Equation (4). In Equation (4), φ is the amount of phase change where the phase of the complex variable CP in Equation (3) is zero.

$$CP(\varphi)=D_A\times GF(2\pi f\tau_A-\varphi) \quad \text{Equation (4)}$$

where $D_A$ is the intensity of reflection light from the object $OB_A$ at the distance $L_A$;

$\tau_A$ is the time for the light to go to and return from the object $OB_A$ at the distance $L_A$;

$\tau_A=2L_A/c$;

c is the speed of light; and

φ is the phase.

Figure 6:
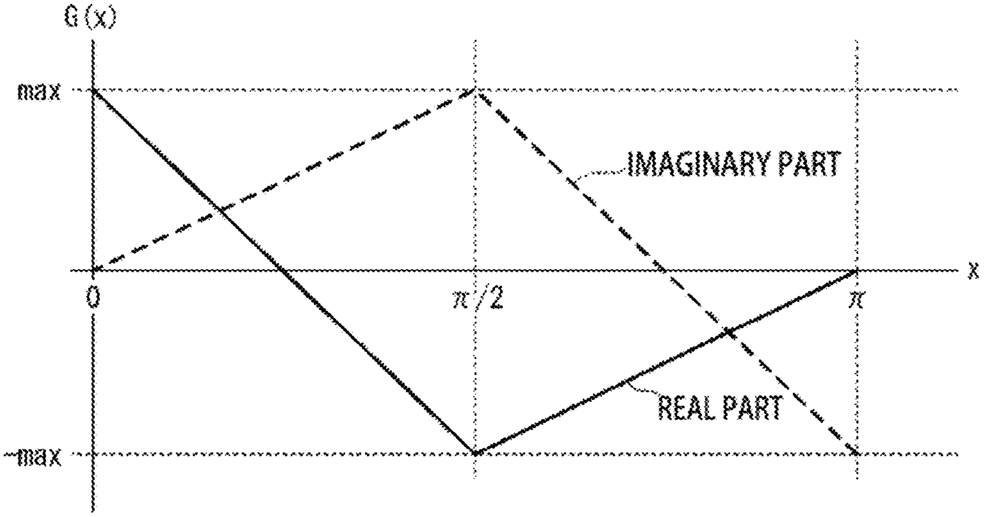
FIG. 6 is a diagram illustrating an example of a complex function CP(φ) according to an embodiment of the present invention.
Figure 7:
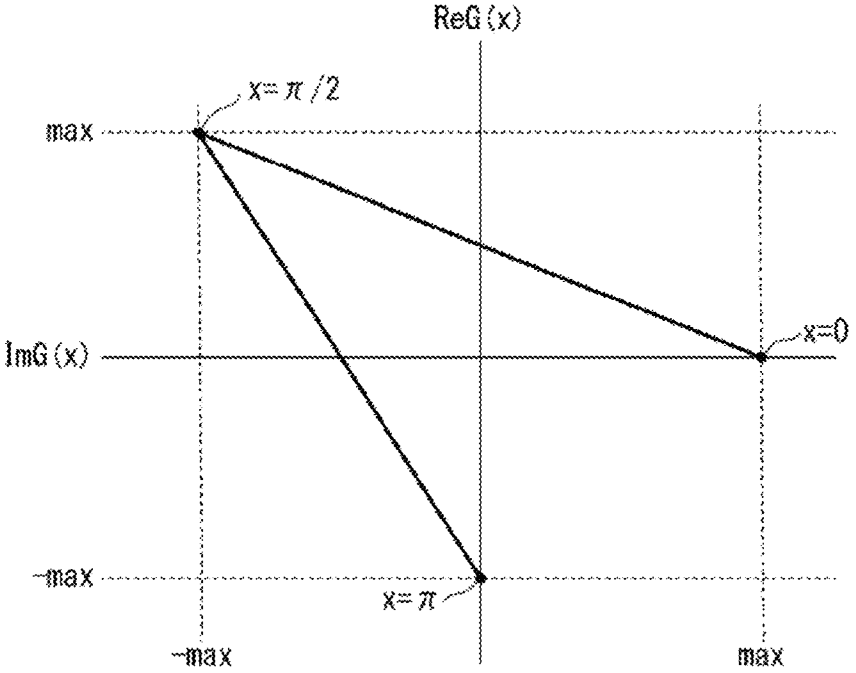
FIG. 7 is a diagram illustrating an example of a complex function CP(φ) according to an embodiment of the present invention.

The behavior of the complex function CP(φ) (changes in the complex number along with changes in phase) will be described with reference to FIGS. 6 and 7. FIGS. 6 and 7 are diagrams illustrating an example of the complex function CP(φ) in the embodiment. In FIG. 6, the horizontal axis indicates phase x, and the vertical axis indicates the value of a function GF(x). In FIG. 6, the solid line indicates the value of the real part of the complex function CP(φ), and the dotted line indicates the value of the imaginary part of the complex function CP(φ).

That is, the value of the feature amount is represented by a complex number in which a first variable that is the difference between the first charge amount and the second charge amount is the real part and a second variable that is the difference between the second charge amount and the third charge amount is the imaginary part.

FIG. 7 illustrates an example of the function GF(x) in FIG. 6 in a complex plane. In FIG. 7, the horizontal axis is the real axis, and the vertical axis is the imaginary axis. The complex function CP(φ) is formed by the value obtained by multiplying the function GF(x) shown in FIGS. 6 and 7 by a constant ($D_A$) corresponding to the intensity of the signal.

The changes in the complex function CP(φ) are determined in accordance with the shape (time-series changes) of the light pulse PO. FIG. 6 illustrates a locus of changes in the complex function CP(φ) along with changes in the phase in the case where the light pulse PO is a rectangular wave, for example.

In the phase x=0 (that is, the delay time Td=0), the charge corresponding to the reflection light is all accumulated in the charge accumulation unit CS1 and is not accumulated in the charge accumulation units CS2 and CS3. Thus, the real part (Q1-Q2) of the function GF(x=0) has a maximum value max, and the imaginary part (Q2-Q3) becomes zero. The value max is a signal value corresponding to the amount of charge corresponding to the total reflection light. In the phase x=π/2 (that is, the delay time Td=the emission time To), the charge corresponding to the reflection light is all accumulated in the charge accumulation unit CS2, and is not accumulated in the charge accumulation units CS1 and CS3. Thus, the real part (Q1-Q2) of the function GF(x=π/2) has a minimum value (−max), and the imaginary part (Q2-Q3) has the maximum value max. In the phase x=π (that is, the delay time Td=the emission time To×2), the charge corresponding to the reflection light is all accumulated in the charge accumulation unit CS3, and is not accumulated in the charge accumulation units CS1 and CS2. Thus, the real part (Q1-Q2) of the function GF(x=7c) becomes zero, and the imaginary part (Q2-Q3) has the minimum value (−max).

As shown in FIG. 7, in the complex plane, in the phase x=0, the function GF(x=0) has a coordinate (max, 0), in the phase x=π/2, the function GF(x=π/2) has a coordinate (−max, max), and in the phase x=π, the function GF(x=π) has a coordinate (0, −max).

The range image processing unit 4 determines whether the pixel 321 has received light in a single path or via multipath propagation based on the tendency of the behavior (changes in the complex number along with changes in the phase) of the function GF(x) as shown in FIGS. 6 and 7. If the tendency of changes in the complex function CP(φ) calculated by measurement matches the tendency of changes in the function GF(x) in a single path, the range image processing unit 4 determines that the pixel 321 has received light in a single path. On the other hand, if the tendency of changes in the complex function CP(φ) calculated by measurement does not match the tendency of changes in the function GF(x) in a single path, the range image processing unit 4 determines that the pixel 321 has received light via multipath propagation.

Figure 8:
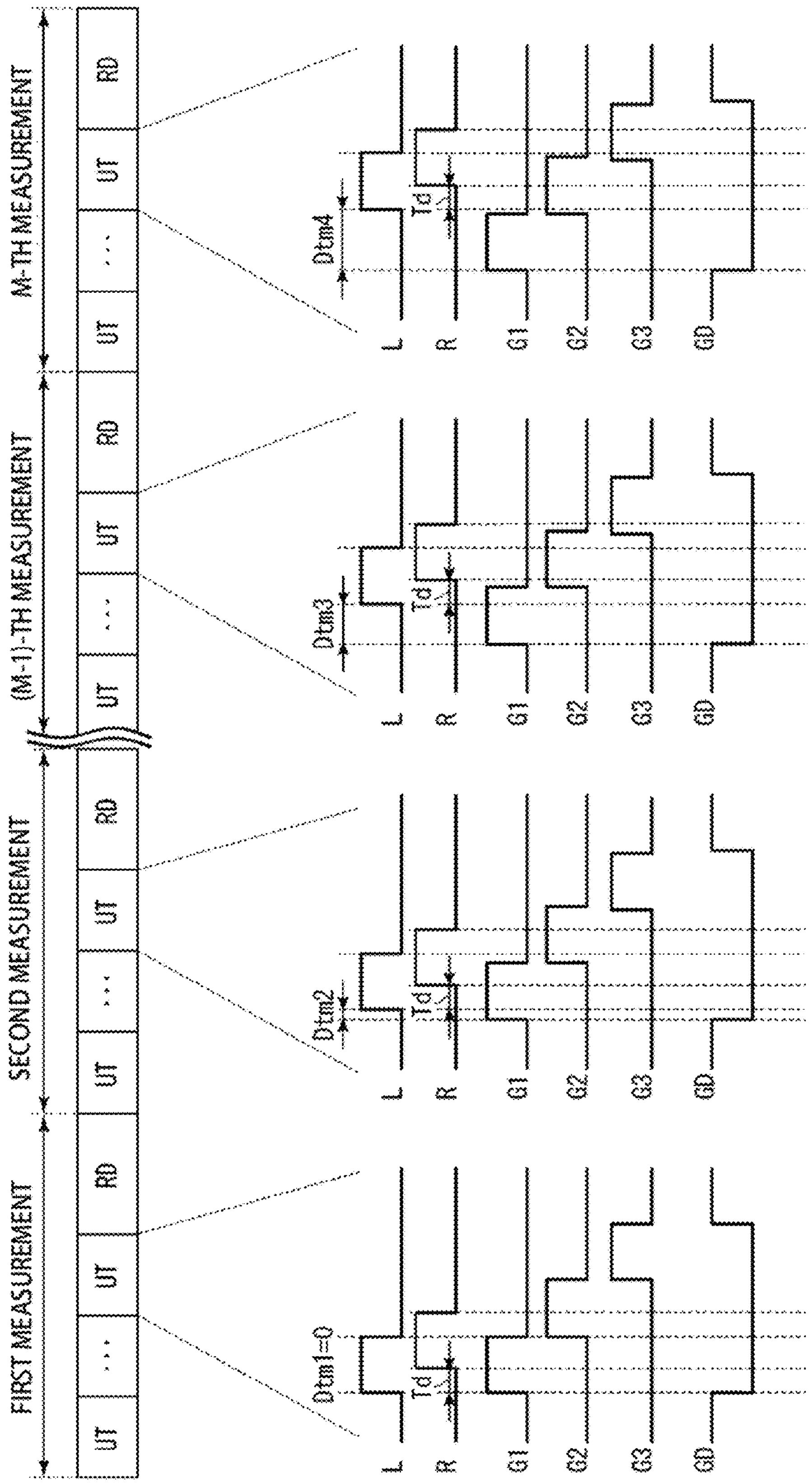
FIG. 8 is a timing chart showing timings for driving a pixel according to an embodiment of the present invention.

A specific method for the range image processing unit 4 to determine whether light has been received in a single path or via multipath propagation will be described with reference to FIG. 8. As shown in FIG. 8, the range image processing unit 4 makes multiple measurements (M measurements in the example of the drawing) with changes in measurement environment. In this example, M is any natural number of 2 or more.

The range image processing unit 4 first performs a measurement in a specific measurement environment, calculates the complex variable CP in Equation (3), and sets the calculated complex variable CP as complex function CP(0) at the phase φ=0.

Then, the range image processing unit 4 performs a measurement in a measurement environment corresponding to the complex function CP(0) in which only the phase φ is changed, and calculates the complex function CP(φ).

Specifically, at the first measurement, the range image processing unit 4 sets the emission timing for emitting the light pulse PO and the accumulation timing for accumulating the charge in the charge accumulation units CS so as to be the same. More specifically, as in the case of FIG. 4, at the start of emission of the light pulse PO, the range image processing unit 4 turns on the charge accumulation unit CS1 and then turns on the charge accumulation units CS2 and CS3 in order, thereby to accumulate the charge in the charge accumulation units CS1 to CS3. In the example of this drawing, as in the case of FIG. 4, the reflection light reflected on the object OB present in the measurement space is received by the pixel 321 with a delay of the delay time Td relative to the emission timing. The range image processing unit 4 calculates the complex function CP(0) at the first measurement.

At the second measurement, the emission timing is delayed by an emission delay time Dtm2 relative to the accumulation timing. More specifically, at the second measurement, the start of the emission of the light pulse PO is delayed by the emission delay time Dtm2 while the timings for turning on the charge accumulation units CS1 to CS3 are fixed. The position of the object OB present in the measurement space is not changed from that at the first measurement. Thus, as with the first measurement, the reflection light from the object OB is received by the pixel 321 with a delay of the delay time Td relative to the emission timing. At the second measurement, since the emission timing is delayed by the emission delay time Dtm2 relative to the emission timing, the reflection light appears to be received by the pixel 321 with a delay (the delay time Td+the emission delay time Dtm2) relative to the emission timing. The range image processing unit 4 calculates the complex function CP(φ1) based on the second measurement. The phase φ1 is the phase (2πf×Dtm2) corresponding to the emission delay time Dtm2. The sign f is the emission frequency (frequency) of the light pulse PO.

At the (M-1)-th measurement, the emission timing is delayed by an emission delay time Dtm3 relative to the accumulation timing. More specifically, at the (M−1)-th measurement, the start of emission of the light pulse PO is delayed by the emission delay time Dtm3 while the timings for turning on the charge accumulation units CS1 to CS3 are fixed. Accordingly, the reflection light appears to be received by the pixel 321 with a delay (the delay time Td+the emission delay time Dtm3) relative to the emission timing. The range image processing unit 4 calculates a complex function CP(φ2) based on the (M−1)-th measurement. The phase φ2 is the phase (2πf×Dtm3) corresponding to the emission delay time Dtm3.

At the M-th measurement, the emission timing is delayed by an emission delay time Dtm4 relative to the accumulation timing. More specifically, the start of emission of the light pulse PO is delayed by the emission delay time Dtm4 while the timings for turning on the charge accumulation units CS1 to CS3 are fixed. Accordingly, the reflection light appears to be received by the pixel 321 with a delay (the delay time Td+the emission delay time Dtm4) relative to the emission timing. The range image processing unit 4 calculates a complex function CP(φ3) based on the M-th measurement. The phase φ3 is the phase (2πf×Dtm4) corresponding to the emission delay time Dtm4.

In the present embodiment, the range image processing unit 4 performs multiple measurements while changing the measurement timings in this manner to calculate the complex function CP at each measurement. In the example of this drawing, the range image processing unit 4 performs the first measurement with the emission delay time Dtm1 (=0) to calculate the complex function CP(0). The range image processing unit 4 performs the second measurement with the emission delay time Dtm2 to calculate the complex function CP(φ1). The range image processing unit 4 performs the (M−1)-th measurement with the emission delay time Dtm3 to calculate the complex function CP(φ2). The range image processing unit 4 performs the M-th measurement with the emission delay time Dtm4 to calculate the complex function CP(φ3).

A specific method for the range image processing unit 4 to determine whether light has been received in a single path or via multipath propagation will be described with reference to FIGS. 9 to 12. As with FIG. 7, FIGS. 9 to 12 illustrate a complex plane in which the horizontal axis is a real axis and the vertical axis is an imaginary axis.

Figure 9:
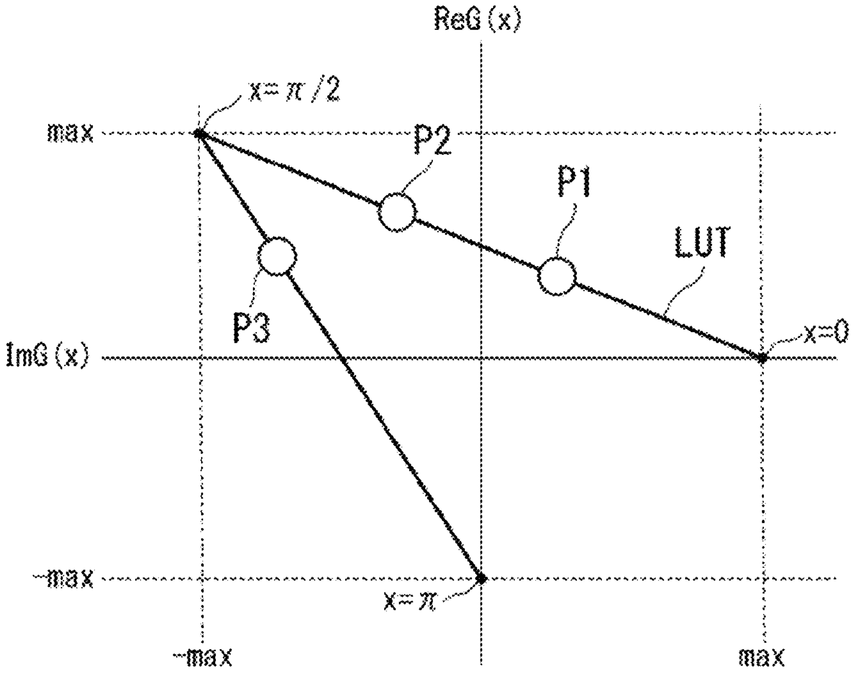
FIG. 9 is a diagram describing a process performed by a range image processing unit according to an embodiment of the present invention.

The range image processing unit 4 plots a look-up table LUT and actual measurement points P1 to P3 in a complex plane as illustrated in FIG. 9, for example. The look-up table LUT includes information in which the function GF(x) and the phase x are associated with each other for the case where the pixel 321 has received light in a single path. The look-up table LUT is measured and stored in advance in a storage unit (not illustrated), for example. The actual measurement points P1 to P3 have values of the complex function CP(φ) calculated by measurement. The range image processing unit 4 determines that the pixel 321 has received light in a single path by measurement if the tendency of changes in the look-up table LUT and the tendency of changes in the actual measurement points P1 to P3 match each other as illustrated in FIG. 9.

Figure 10:
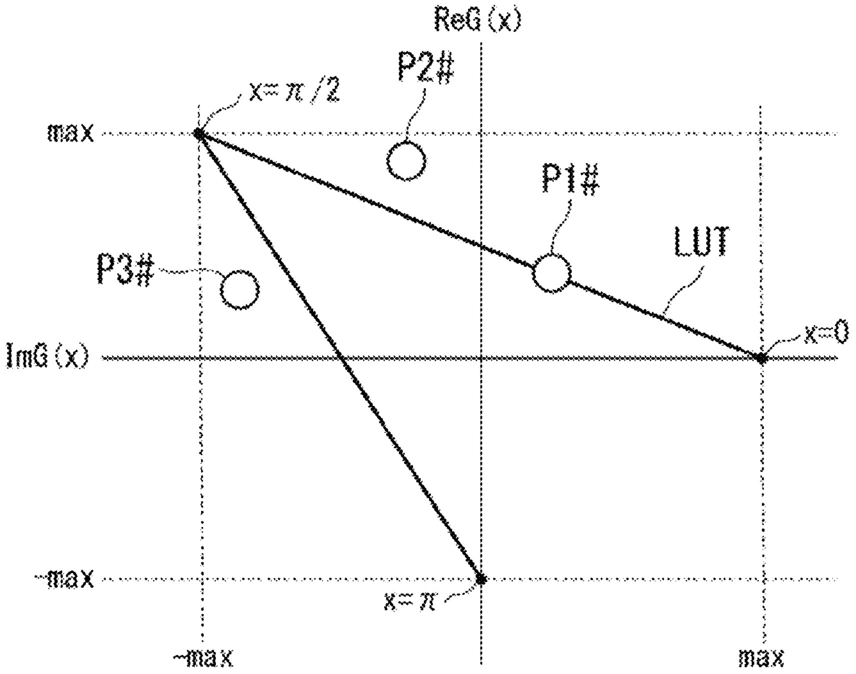
FIG. 10 is a diagram describing a process performed by a range image processing unit according to an embodiment of the present invention.

The range image processing unit 4 plots a look-up table LUT and actual measurement points P1# to P3# in a complex plane as illustrated in FIG. 10. The look-up table LUT here is similar to the look-up table LUT illustrated in FIG. 9. The actual measurement points P1# to P3# have values of the complex function CP(φ) calculated by measurement in a measurement space different from that in FIG. 9. The range image processing unit 4 determines that the pixel 321 has received light via multipath propagation by measurement if the tendency of changes in the look-up table LUT and the tendency of changes in the actual measurement points P1# to P3# do not match each other as illustrated in FIG. 10.

The range image processing unit 4 determines whether the tendency of the look-up table LUT and the tendency of the actual measurement points P1 to P3 match each other (match determination). A method for the range image processing unit 4 to perform match determination using scale adjustment and an SD index will be described.

Scale Adjustment

The range image processing unit 4 performs scale adjustment as necessary. The scale adjustment is a process of adjusting the scale (the absolute value of a complex number) of the look-up table LUT and the scale (the absolute value of a complex number) of an actual measurement point P to be the same. As shown in Equation (4), the complex function CP(φ) has a value obtained by multiplying the function GF(x) by a constant $D_A$. The constant $D_A$ is a constant value determined in accordance with the amount of received reflection light. That is, the constant $D_A$ has a value determined at each measurement in accordance with the emission time of the light pulse PO, the emission intensity, the number of distributions in each frame, and others. Thus, the actual measurement points P form coordinates increased (or reduced) by the constant $D_A$ with reference to the origin point, as compared to the corresponding points of the look-up table LUT.

In this case, the range image processing unit 4 performs scale adjustment in order to make it easy to determine whether the tendency of the look-up table LUT and the tendency of the actual measurement points P1 to P3 match each other.

Figure 11:
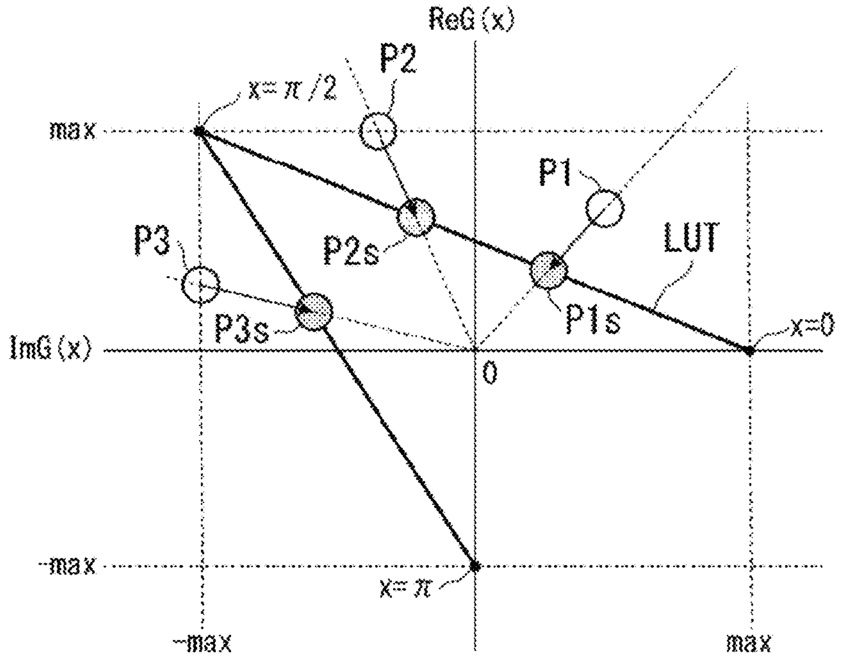
FIG. 11 is a diagram describing a process performed by a range image processing unit according to an embodiment of the present invention.

The range image processing unit 4 extracts a specific actual measurement point (for example, the actual measurement point P1) among the actual measurement points P1 to P3 as illustrated in FIG. 11. The range image processing unit 4 multiplies the extracted actual measurement point by a constant D with reference to the origin point and performs scale adjustment such that an actual measurement point Ps after the scale adjustment (for example, actual measurement point P1*s*) is positioned on the look-up table LUT. Then, for the remaining actual measurement points P (for example, the actual measurement points P2 and P3), the range image processing unit 4 sets values obtained by multiplying by the same multiplication value (constant D) as actual measurement points Ps after the scale adjustment (for example, actual measurement points P2*s* and P3*s*).

The range image processing unit 4 is not required to perform scale adjustment if a specific actual measurement point P (for example, the actual measurement point P1) is positioned on the look-up table LUT without scale adjustment. In this case, the range image processing unit 4 can omit scale adjustment.

Match Determination Using SD Index

Figure 12:
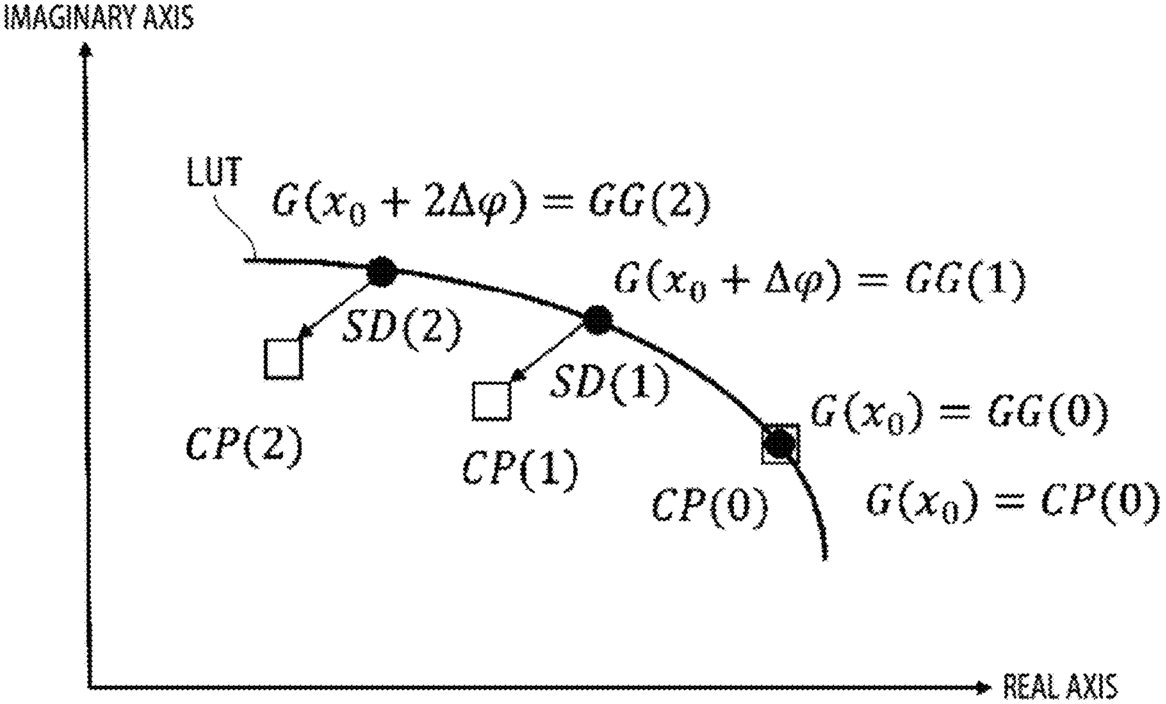
FIG. 12 is a diagram describing a process performed by a range image processing unit according to an embodiment of the present invention.

Match determination using an SD index will be described with reference to FIG. 12. FIG. 12 shows a complex plane where the horizontal axis indicates a real axis and the vertical axis indicates an imaginary axis. FIG. 12 shows the look-up table LUT that indicates the function GF(x) for the case where the pixel 321 has received light in a single path, and points on the look-up table LUT, G(x0), G(x0+Δφ), and G(x0+2Δφ). FIG. 12 also shows complex functions CP(0), CP(1), and CP(2) as actual measurement points.

The range image processing unit 4 first generates (defines) a function GG(n) that has a start point matched to that of the complex function CP(n) obtained by measurement. The sign n is a natural number indicating a measurement number. For example, n is set such that, among multiple measurements, (n=0) at the first measurement, (n=1) at the second measurement, . . . , and (n=NN-1) at the NN-th measurement.

The function GG(x) is a function in which the phase of the function GF(x) is shifted so as to match the start point of the complex function CP(n) obtained by measurement. For example, as shown in Equation (5), the range image processing unit 4 generates the function GG(x) in which the amount of phase ($x_0$) corresponding to the complex function CP(n=0) obtained by the first measurement is set as initial phase and the initial phase is shifted. In Equation (5), $x_0$ indicates the initial phase, n indicates the measurement number, and Δφ indicates the phase shift amount at each measurement.

$$GG(n) \equiv GF(x_0 + n\Delta\varphi) \qquad \text{Equation (5)}$$

Then, the range image processing unit 4 generates (defines) a function SD(n) indicating the difference between the complex function CP(n) and the function GG(x) as shown in Equation (6). In Equation (6), n indicates the measurement number.

$$SD(n) \equiv CP(n) - GG(n) \qquad \text{Equation (6)}$$

Then, the range image processing unit 4 uses the function SD(n) to calculate an SD index (index value) indicating the degree of similarity between the complex function CP(n) and the function GG(x) as shown in Equation (7). In Equation (7), n indicates the measurement number, and NN indicates the number of measurement counts. The SD index defined here is an example. In the SD index, the degree of dissociation between the complex function CP(n) and the function GG(n) in a complex plane is substituted by a single real number. As a matter of the course, the function form can be adjusted in accordance with the function form of the function GF(x) or the like. The SD index can be arbitrarily defined as far as the SD index is an index indicating the degree of dissociation between the complex function CP(n) and the function GG(n) in a complex plane.

$$SD \text{ index} = \left| \sum_{n=0}^{NN-1} \frac{SD(n)}{|GG(n)|} \right| \qquad \text{Equation (7)}$$

The range image processing unit 4 compares the calculated SD index with a predetermined threshold. If the SD index does not exceed the predetermined threshold, the range image processing unit 4 determines that the pixel 321 has received light in a single path. On the other hand, if the SD index exceeds the predetermined threshold, the range image processing unit 4 determines that the pixel 321 has received light via multipath propagation.

The SD index is a summation obtained by normalizing the difference between a first feature amount that is a feature amount calculated at each of the measurements and a second feature amount that is a feature amount corresponding to each of the measurements in the look-up table LUT into a difference normalized value by the absolute value of the second feature amount, and then summing the difference normalized values at the measurements.

A method for the range image processing unit 4 to calculate the measurement distance in accordance with the determination result will be described. The determination result here is the result of determination on whether light has been received in a single path or via multipath propagation.

If light has been received in a single path, the range image processing unit 4 calculates the measurement distance using Equation (8). In Equation (8), n indicates the measurement number, $x_0$ indicates the initial phase, n indicates the measurement number, and Δφ indicates the phase shift amount at each measurement. The internal distance in Equation (8) can be arbitrarily set in accordance with the structure of the pixel 321. If no particular consideration is given to the internal distance, the internal distance is set to zero.

$$CP(n) = GF(x_0 + n\Delta\varphi) \qquad \text{Equation (8)}$$

$$x_0 = 2\pi \frac{(L + \text{Internal distance})}{\text{Maximum measurable distance}}$$

where $$\text{Maximum measurable distance} = \frac{c}{2f}$$

Alternatively, if the range image processing unit 4 determines that the pixel 321 has received light in a single path, the range image processing unit 4 may calculate the delay time Td by Equation (1) and calculate the measurement distance using the calculated delay time Td.

If light has been received via multipath propagation, the range image processing unit 4 represents the complex function CP obtained by measurement as the sum of reflection light from multiple (two in this example) paths as shown in Equation (9). In Equation (9), $D_A$ is the intensity of the reflection light from an object $OB_A$ at a distance $L_A$, $x_A$ is the phase necessary for the light to go to and return from the object $OB_A$ at the distance $L_A$, n is the measurement number, $\Delta\varphi$ is the amount of phase shift at each measurement, $D_B$ is the intensity of reflection light from an object $OB_B$ at a distance $L_B$, $x_B$ is the phase necessary for the light to go to and return from the object $OB_B$ at the distance $L_B$.

$$CP(n) = D_A GF(x_A + n\Delta\varphi) + D_B GF(x_B + n\Delta\varphi),\ D_A, D_B > 0 \quad \text{Equation (9)}$$

$$x_A = 2\pi\frac{L_A + \text{Internal distance}}{\text{Maximum measurable distance}},$$

$$x_B = 2\pi\frac{L_B + \text{Internal distance}}{\text{Maximum measurable distance}}$$

The range image processing unit 4 determines a combination of {phases $x_A$, $x_B$ and intensities $D_A$, $D_B$} with which a difference J shown in Equation (10) is minimum. The difference J corresponds to the sum of squares of absolute value of the difference between the complex function CP(n) and the function G in Equation (9). The range image processing unit 4 determines a combination of {phases $x_A$, $x_B$ and intensities $D_A$, $D_B$} by applying the least-squares method or the like, for example.

$$J = \sum_{n=0}^{NN-1} |CP(n) - D_A GF(x_A + n\Delta\varphi) - D_B GF(x_B + n\Delta\varphi)|^2 \quad \text{Equation (10)}$$

In the example described above, the look-up table LUT is used to determine whether light has been received in a single path or via multipath propagation. However, the present disclosure is not limited to this. The range image processing unit 4 may use an equation representing the function GF(x) instead of the look-up table LUT.

The equation representing the function GF(x) is an equation that is defined in accordance with the range of the phase, for example.

In the example of FIG. 7, in the range of the phase x ($0 \le x \le 2/\pi$), the function GF(x) is defined as a linear function of a slope (−½) and an intercept (max/2). In addition, within the range ($2/\pi 0 < x \le \pi$), the function GF(x) is defined as a linear function of a slope (−2) and an intercept (−max).

The look-up table LUT may be generated based on the results of actual measurements in an environment where light is received only in a single path or may be generated based on the results of calculation by simulation or the like.

In the example described above, the complex variable CP shown in Equation (2) is used. However, the present disclosure is not limited to this. The complex variable CP is at least a variable that is calculated by using the amount of charge accumulated in the charge accumulation unit CS that accumulates the charge in accordance with the reflection light RL. For example, the complex variable CP may be a complex variable CP2=(Q2-Q3)+j(Q1-Q2) in which the real part and the imaginary part are interchanged or may be a complex variable CP3=(Q1-Q3)+j(Q2-Q3) in which a combination of the real part and imaginary part is changed.

In the example described above, the timing for turning on the charge accumulation unit CS (accumulation timing) is fixed and the emission timing for emitting the light pulse PO is delayed as shown in FIG. 8. However, the present disclosure is not limited to this. The accumulation timing and the emission timing are at least relatively changed at multiple measurements. As a matter of the course, the emission timing may be fixed and the accumulation timing may be accelerated, for example. In the example described above, the function SD(n) is defined by Equation (6). However, the present disclosure is not limited to this. The function SD(n) can be arbitrarily defined as far as the function SD(n) is a function representing the difference between the complex function CP(n) and the function GG(n) in a complex plane.

A range imaging method used by the range imaging device 1 in the embodiment will be described with reference to FIG. 13.

Figure 13:
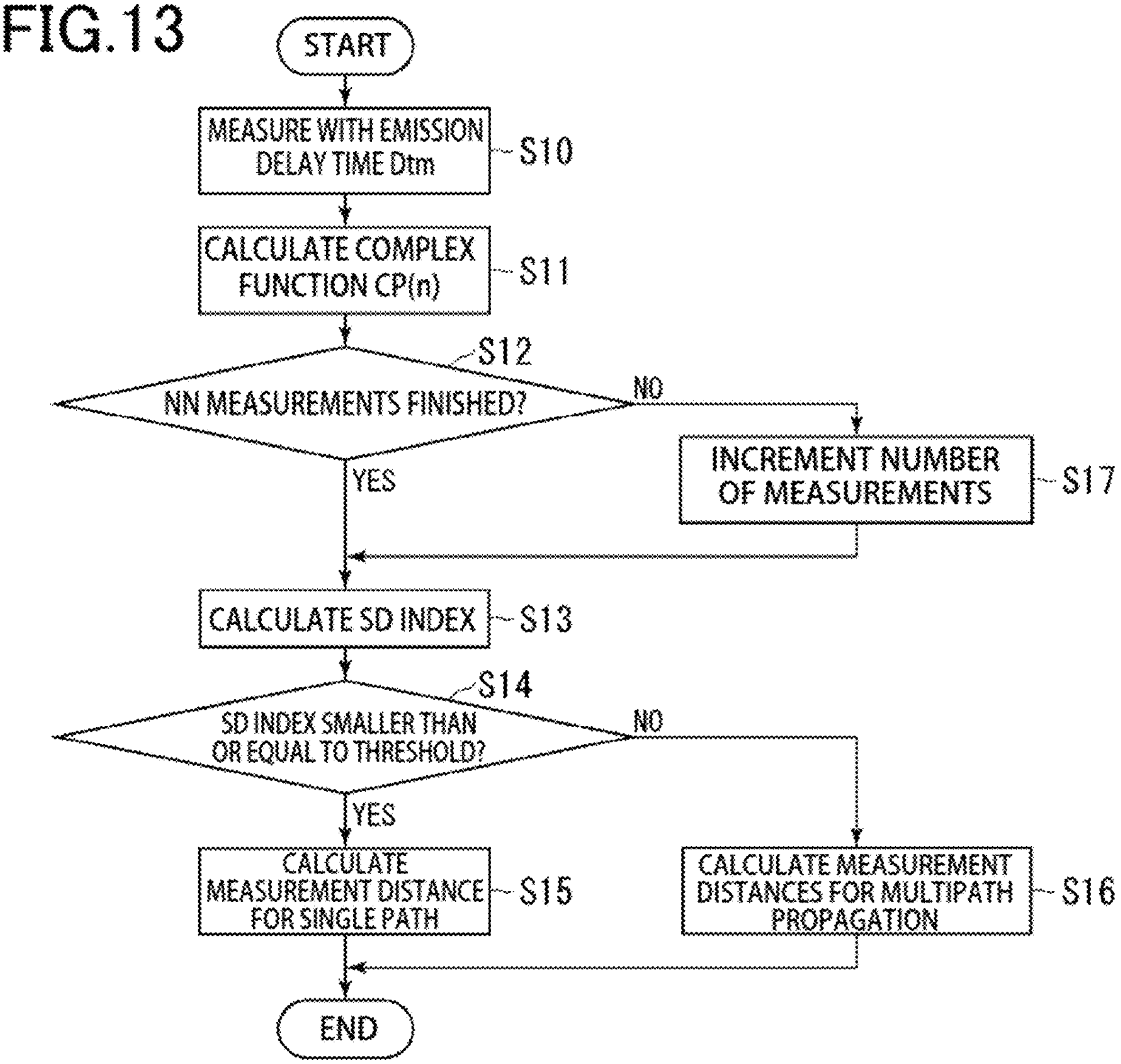
FIG. 13 is a flowchart of a process performed by a range imaging device according to an embodiment of the present invention.

FIG. 13 is a flowchart of a process performed by the range imaging device 1 in the embodiment.

The example of this flowchart is based on the preconditions that NN (≥2) measurements are performed and that the emission delay time Dtm is predetermined at each of the NN measurements.

Step S10

The range image processing unit 4 sets the emission delay time Dtm and performs measurements. The range image processing unit 4 sets the emission delay time Dtm, performs charge accumulation for a number of distributions corresponding to each frame at the set measurement timing, and accumulates charge in the charge accumulation units CS.

Step S11

The range image processing unit 4 calculates the complex function CP(n) based on the amounts of charge accumulated in the charge accumulation units CS obtained by measurement. The sign n is the measurement number.

Step S12

The range image processing unit 4 determines whether the NN measurements have been finished. If the NN measurements have been finished, the process proceeds to step S13. If the NN measurements have not yet been finished, the range image processing unit 4 increases the measurement count (step S17), and the process returns to step S10 to repeat the measurement.

Step S13

The range image processing unit 4 calculates the SD index. The range image processing unit 4 performs scale adjustment as necessary to the complex function CP(n) obtained by measurement. The range image processing unit 4 uses the complex function CP(n) after the scale adjustment to generate the function GG(n) with the start point matched. The range image processing unit 4 uses the generated function GG(n) and the complex function CP(n) after the scale adjustment to generate the difference function SD(n). The range image processing unit 4 uses the generated function SD(n) and function GG(n) to calculate the SD index.

Step S14

The range image processing unit 4 compares the SD index with a predetermined threshold. IF the SD index does not exceed the threshold, the range image processing unit 4 moves to step S15. On the other hand, if the SD index exceeds the threshold, the range image processing unit 4 moves to step S16.

Step S15

The range image processing unit 4 determines that the pixels 321 has received light in a single path and calculates the distance corresponding to the to-and-fro path of the light in a single path as a measurement distance.

Step S16

The range image processing unit 4 determines that the pixel 321 has received light via multipath propagation and calculates the distance corresponding to each of paths included in the multipath propagation by using the least-squares method or the like, for example.

As described above, the range imaging device 1 of the embodiment includes the light source unit 2, the light-receiving unit 3, and the range image processing unit 4. The light source unit 2 emits the light pulse PO to the measurement space E. The light-receiving unit 3 includes the pixels that each include the photoelectric conversion element PD generating charge in accordance with the incident light and the charge accumulation units CS accumulating the charge, and the vertical scanning circuit 323 (pixel drive circuit) that performs a unit accumulation process of distributing and accumulating the charge in the charge accumulation units CS at the predetermined accumulation timing synchronized with the emission of the light pulse PO. The range image processing unit 4 controls the emission timing for emitting the light pulse PO and the accumulation timing for distributing and accumulating the charge in the charge accumulation units CS. Based on the amounts of charge accumulated in the charge accumulation units CS, the range image processing unit 4 calculates the distance to the object OB present in the measurement space E. The range image processing unit 4 performs multiple measurements. Among the measurements, the relative timing relationship between the emission timing and the accumulation timing is different. The range image processing unit 4 calculates the complex function CP(n) at each of the measurements. The sign n is the measurement number. Based on the SD index, the range image processing unit 4 determines whether the reflection light RL has been received by the pixel 321 in a single path or the reflection light RL has been received by the pixel 321 via multipath propagation. The range image processing unit 4 calculates the distance to the object OB present in the measurement space E in accordance with the determination results.

Accordingly, the range imaging device 1 in the embodiment can determine whether the pixel 321 has received light in a single path or via multipath propagation. The complex variable CP, the complex function (φ), the complex function CP(n), the function GF(x), and the function GG(n) are examples of "feature amount based on the amounts of charge accumulated at each of the measurements". The SD index is an example of the "tendency of feature amount".

The range imaging device 1 in the embodiment may perform determination using the look-up table LUT. The look-up table LUT is a table in which the phase (relative timing relationship) and the function GF(x) (feature amount) are associated with each other for the case where the reflection light RL has received by the pixel 321 in a single path. If the actual measurement points P can be plotted as points on the look-up table LUT, the range image processing unit 4 determines that the reflection light RL has been received by the pixel 321 in a single path. That is, the range image processing unit 4 determines whether the reflection light RL has been received by the pixel 321 in a single path or the reflection light RL has been received by the pixel 321 via multipath propagation, based on the degree of similarity between the tendency of the look-up table LUT and the tendency of feature amount at each of the measurements. Accordingly, the range imaging device 1 in the embodiment can perform determination by a simple method of comparing the tendency with the look-up table LUT.

In the range imaging device 1 of the embodiment, the look-up table LUT is generated under at least any of measurement conditions among the shape of the light pulse PO, the emission time To of the light pulse PO, and the accumulation time Ta during which the charge is accumulated in each of the charge accumulation units CS. The range image processing unit 4 determines whether the reflection light RL has been received by the pixel 321 in a single path or the reflection light RL has been received by the pixel 321 via multipath propagation using the look-up table LUT corresponding to the measurement condition. Accordingly, the range imaging device 1 in the embodiment can select an appropriate look-up table LUT under the measurement condition, and perform accurate determination.

In the range imaging device 1 of the embodiment, the value of the feature amount is calculated using, among the amounts of charge accumulated in the three charge accumulation units CS, the amount of charge accumulated in the charge accumulation unit CS in which at least the charge corresponding to the reflection light RL is accumulated. Accordingly, the range imaging device 1 in the embodiment can determine whether the reflection light RL has been received by the pixel 321 in a single path or the reflection light RL has been received by the pixel 321 via multipath propagation in accordance with the situation where the reflection light RL is received.

In the range imaging device 1 of the embodiment, the feature amount is represented by the complex variable CP. Accordingly, the range imaging device 1 in the embodiment can determine whether the reflection light RL has been received by the pixel 321 in a single path or the reflection light RL has been received by the pixel 321 via multipath propagation by observing the behavior of the complex variable CP while regarding the delay time Td as a phase delay.

In the range imaging device 1 of the embodiment, if the range image processing unit 4 determines that the reflection light RL has been received by the pixel 321 in a single path, the range image processing unit 4 may determine the distance to the object OB by the least-squares method, based on measurements at multiple measurement timings. Also in this case, it is possible to determine the most probable path for each single path and calculate the distance corresponding to each single path. If the range image processing unit 4 determines that the reflection light RL has been received by the pixel 321 via multipath propagation, the range image processing unit 4 calculates the distance corresponding to each light path included in the multipath propagation by applying the least-squares method. Accordingly, the range imaging device 1 in the embodiment can determine the most probable path for each path included in the multipath propagation and calculate the distance corresponding to each path in the multipath propagation.

Modification Example of Embodiment

A modification example of the embodiment will be described. The present modification example is different from the embodiment described above in that, in accordance with the results of a first measurement among multiple measurements, an emission delay time Dtim is determined for the remaining measurements.

Figure 14:
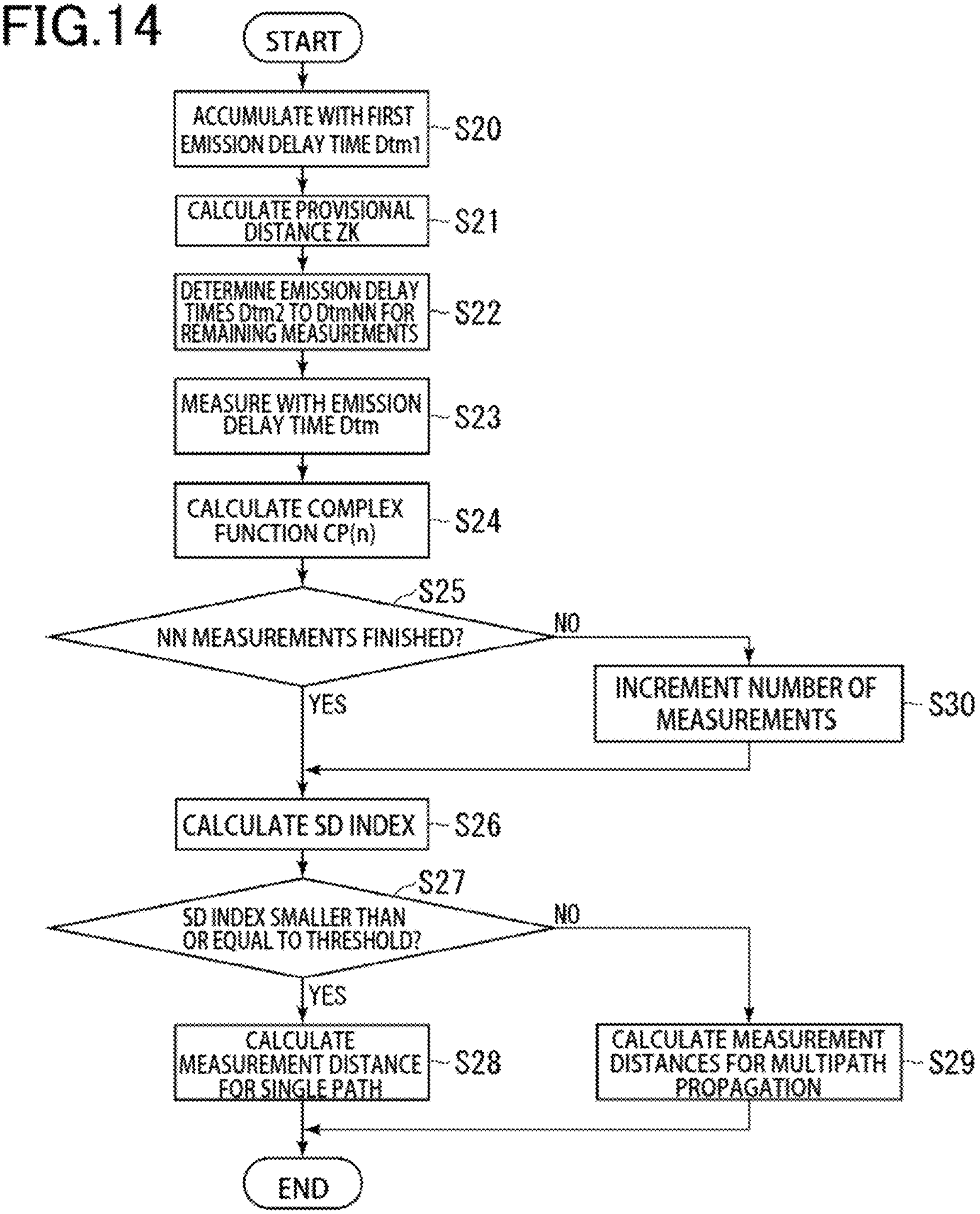
FIG. 14 is a flowchart of a process performed by a range imaging device according to a modification example according to an embodiment of the present invention.

A flow of a process performed by a range imaging device 1 according to the present modification example will be described with reference to FIG. 14. FIG. 14 is a flowchart of the process performed by the range imaging device 1 according to the modification example of the embodiment.

Steps S23 to S30 in the flowchart of FIG. 14 are the same as steps S10 to S17 in the flowchart of FIG. 13, and thus description thereof will be omitted.

Step S20

A range image processing unit 4 makes a first measurement at a predetermined emission delay time Dtim1. The emission delay time Dtim1 has a predetermined value, which is zero, for example.

Step S21

The range image processing unit 4 calculates a provisional distance ZK based on the amounts of charge accumulated in charge accumulation units CS at the first measurement. The range image processing unit 4 calculates the provisional distance ZK, regarding that a pixel 321 has received light in a single path at the first measurement. The range image processing unit 4 calculates the provisional distance ZK using a method similar to that in a case where the range image processing unit 4 determines that the pixel 321 has received light in a single path.

Step S22

The range image processing unit 4 uses the provisional distance ZK to determine emission delay times Dtim2 to DtimNN to be applied to the remaining measurements. The range image processing unit 4 determines the emission delay times Dtim2 to DtimNN such that the distances near the provisional distance ZK can be accurately calculated, for example.

For example, the case where the phase corresponding to the provisional distance ZK is in the vicinity of $\pi/4$ will be discussed. In this case, if a function GF(x) as shown in FIG. 7 is a function that is changed in the vicinity of $x=2/\pi$, it is easier to make a determination of whether single path or multipath propagation is present with a phase x $(0 \le x \le \pi/2)$ corresponding to the emission delay time Dtim. Thus, the range image processing unit 4 determines the emission delay times Dtim2 to DtimNN to be applied to the remaining measurements within a range of $(0 \le x \le \pi/2)$.

For example, the case where a phase corresponding to the provisional ZK is in the vicinity of (π’¾) will be discussed. In this case, if the function GF(x) as shown in FIG. 7 is a function that is changed in the vicinity of $x=2/\pi$, it is easier to make a determination of whether single path or multipath propagation is present with the phase x $(\pi/2 < x \le \pi)$ corresponding to the emission delay time Dtim. Thus, the range image processing unit 4 determines the emission delay times Dtim2 to DtimNN to be applied to the remaining measurements within a range of $(\pi/2 < x \le \pi)$.

For example, the case where a phase corresponding to the provisional ZK is in the vicinity of $\pi/2$ will be discussed. In this case, if the function GF(x) as shown in FIG. 7 is a function that is changed in the vicinity of $x=\pi/2$, it is easier to make a determination of whether single path or multipath propagation is present with either the phase x $(0 \le x \le \pi/2)$ or $(\pi/2 < x \le \pi)$ corresponding to the emission delay time Dtim. Thus, the range image processing unit 4 determines the emission delay times Dtim2 to DtimNN to be applied to the remaining measurements within a range of either $(0 \le x \le \pi/2)$ or $(\pi/2 < x \le \pi)$.

In this case, the range image processing unit 4 may determine not only the emission delay time Dtim but also the number of distributions for the remaining measurements. For example, if the provisional distance ZK is a far distance that is longer than a predetermined distance, the range image processing unit 4 increases the number of distributions as compared to the case where the provisional distance ZK is a near distance that is shorter than the predetermined distance. In general, if the reflection light comes from the object OB at a far distance, the amount of the reflection light RL having reached the range imaging device 1 decreases. Thus, in the case of a far distance, the number of distributions is increased to increase the amount of charge accumulated at one measurement. This makes it possible to calculate the measurement distance with accuracy even in the case of a far distance.

As described above, in the range imaging device 1 according to the modification example of the embodiment, the range image processing unit 4 calculates the provisional distance ZK to the object OB based on the first measurement among the measurements. The range image processing unit 4 determines the emission delay time Dtim (an example of "delay time") to be used for the remaining measurements among the measurements based on the provisional distance ZK. Accordingly, the range imaging device 1 according to the modification example of the embodiment can determine the emission delay time Dtim in accordance with the situation of the object OB present in the measurement space E and make an accurate determination of whether single path or multipath propagation is present.

In the range imaging device 1 according to the modification example of the embodiment, the range image processing unit 4 may determine the emission delay time Dtim based on the time (phase) necessary for the light pulse PO to travel the provisional distance ZK and the tendency of the function GF(x). Accordingly, the range imaging device 1 according to the modification example of the embodiment can determine the emission delay time Dtim corresponding to either one of linear ranges $(0 \le x \le \pi/2)$ and $(\pi/2 < x \le \pi)$, for example, based on the tendency of the function GF(x). Therefore, it is possible to make an accurate determination of whether single path or multipath propagation is present.

In the range imaging device 1 according to the modification example of the embodiment, if the provisional distance ZK is a far distance exceeding a threshold, the range image processing unit 4 increases the number of distributions ("the number of accumulations") for the remaining measurements among the measurements, as compared to the case where the provisional distance ZK is a short distance not exceeding the threshold. Accordingly, in the range imaging device 1 according to the modification example of the embodiment, it is possible to calculate the distance with accuracy even if an object is at a far distance.

In the range imaging device 1 according to the embodiment and the modification example of the embodiment, if the pixel 321 has received light in a single path, the representative value of the distances calculated at the measurements may be determined as the calculation result of the measurement distance. Accordingly, it is possible to determine the measurement distance with accuracy as compared to the case of using the measurement distance calculated at one measurement.

In the modification example of the embodiment, when calculating the distance of each path in the multipath propagation using the least-squares method, the range image processing unit 4 may narrow down the range to find a combination of optimum solutions, based on the provisional distance ZK. For example, the range image processing unit 4 regards that the reflection light from the object OB present in the range of the provisional distance ZK+α centering on the provisional distance ZK has been received via multipath propagation, and performs a computation to find a combination of optimum solutions in that range. Accordingly, it is possible to calculate errors in combinations of solutions within the limited range and reduce a computational load, as compared to the case of calculating errors in all the combinations of possible solutions.

In the embodiment described above, each pixel 321 includes the three charge accumulation units CS1 to CS3 as an example. However, the present disclosure is not limited to this. The present disclosure is also applicable to the case where each pixel 321 includes four or more charge accumulation units CS. For example, if each pixel 321 includes four charge accumulation units CS, a complex variable CP can be defined as shown in Equations (11) and (12) below as an example. The definition method is not limited to the mathematical expressions shown in Equations (11) and (12), and a complex variable CP may be defined in which the real part and the imaginary part have values calculated by summing or subtracting a first charge amount, a second charge amount, a third charge amount, and a fourth charge amount in the charge accumulation units CS1 to CS4.

$$CP=(Q1-Q3)+j(Q2-Q4) \quad \text{Equation (11)}$$

$$CP=\{(Q1+Q2)-(Q3+Q4)\}+j\{(Q2+Q3)-(Q4+Q1)\} \quad \text{Equation (12)}$$

where j is the imaginary unit;

Q1 is the amount of charge accumulated in the charge accumulation unit CS1 (first charge amount);

Q2 is the amount of charge accumulated in the charge accumulation unit CS2 (second charge amount); and Q3 is the amount of charge accumulated in the charge accumulation unit CS3 (third charge amount).

Q4 is the accumulated charge amount in the charge accumulation unit CS4 (fourth charge amount).

In Equation (11) above, the feature amount has a value represented by a complex number in which the real part is a first variable that is the difference between the first charge amount in the first charge accumulation unit and the third charge amount in the third charge accumulation unit, and the imaginary part is a second variable that is the difference between the second charge amount in the second charge accumulation unit and the fourth charge amount in the fourth charge accumulation unit.

The range imaging device 1 and the range image processing unit 4 in the embodiment described above may be entirely or partially implemented by a computer. In that case, programs for implementing the functions may be recorded on a computer-readable recording medium and the programs recorded on the recording medium may be read and executed by a computer system to implement the functions. The "computer system" here refers to a system that includes an OS and hardware such as peripheral devices. The "computer-readable recording medium" here refers to a storage device such as a portable medium such as a flexible disc, a magneto-optical disc, a ROM, or a CD-ROM, or a hard disc built in the computer system, or the like. The "computer-readable recording medium" here may further include a medium dynamically holding the programs in a short time as in a communication line in the case of transmitting the programs via a network such as the Internet or a communication line such as a telephone line, and a medium holding the programs for a certain time such as a volatile-memory in the computer system that is a server or a client in that case. The programs may be programs for implementing some of the functions described above, or may be programs that can implement the functions described above in a combination with programs already recorded in the computer system, or may be programs implemented using a programmable logic device such as FPGA.

The embodiment and modification example of the present disclosure have been described in detail with reference to the drawings. However, specific configurations are not limited to the embodiment and modification example, and also include designs and others without departing from the gist of the present disclosure.

According to an embodiment of the present invention, it is determined whether a pixel has received light in a single path or via multipath propagation. If it is determined that the pixel has received light in a single path, it is possible to calculate the distance to one reflecting body. If it is determined that the pixel has received light via multipath propagation, it is possible to calculate the distance to each of multiple reflecting bodies.

There has been a technique for measuring the distance to an object by measuring the flight time of a light pulse. Such a technique is called time of flight (hereinafter, called TOF). In the TOF technique, the distance to an object is calculated taking the advantage of the fact that the speed of light is known. There have been commercialized range imaging devices that use the TOF technique to obtain depth information from each pixel in a two-dimensional image of an object, that is, three-dimensional information of the object. In a range imaging device, pixels including photodiodes (PDs) are formed in a two-dimensional matrix on a silicone substrate, and reflection light of a light pulse from the object is received on the pixel surfaces. The range imaging device outputs photoelectric conversion signals for each image based on the amounts of light (the amounts of electrical charge) received by the pixels to obtain a two-dimensional image of the object and distance information from each of the pixels constituting the image. For example, JP 4235729 B describes a technique for calculating the distance by distributing and accumulating the charge according to the received light in three charge accumulation units provided in one pixel.

In such a range imaging device, there is defined an arithmetic expression for calculating the distance to an object on the assumption that the pixels receive a direct wave (single path) directly traveling between the light source of the light pulse and the object. However, the light pulse may be multiply reflected on corners of the object or uneven surfaces of the object, so that the reflection light may be received via multipath propagation with a mixture of direct wave and indirect wave. Upon receipt of such light via multipath propagation, if the distance is calculated on the false recognition that the light has been received in a single path, an error may occur in the measured distance.

A range imaging device according to an embodiment of the present invention determines whether pixels have received light in a single path or via multipath propagation, and a range imaging method. According to an embodiment of the present, the distance to one reflecting body is calculated if it is determined that the pixels have received light in a single path, and the distance to each of reflecting bodies is calculated if it is determined that the pixels have received light via multipath propagation.

A range imaging device according to an embodiment of the present invention includes: a light source unit that emits a light pulse to a measurement space that is a space of a measurement target; a light-receiving unit that has a pixel and a pixel drive circuit, the pixel including a photoelectric conversion element that generates charge in accordance with incident light and three or more charge accumulation units that accumulate the charge, the pixel drive circuit distributing and accumulating the charge in the charge accumulation units in the pixel at a timing synchronized with the emission of the light pulse; and a range image processing unit that controls an emission timing for emitting the light pulse and an accumulation timing for distributing and accumulating the charge in the charge accumulation units, and calculates a distance to an object present in the measurement space based on amounts of charge accumulated in the charge accumulation units. The range image processing unit performs multiple measurements different in relative timing relationship between the emission timing and the accumulation timing, extracts a feature amount based on the amounts of charge accumulated at the measurements, determines whether reflection light of the light pulse has been received by the pixel in a single path or the reflection light of the light pulse has been received by the pixel via multipath propagation, based on tendency of the extracted feature amount, and calculates the distance to the object present in the measurement space in accordance with a result of the determination.

In the range imaging device according to an embodiment of the present invention, the range image processing unit may use a look-up table in which the relative timing relationship and the feature amount are associated with each other for a case where the reflection light has been received by the pixel in a single path to determine whether the reflection light of the light pulse has been received by the pixel in a single path or the reflection light of the light pulse has been received by the pixel via multipath propagation, based on degree of similarity between tendency of the look-up table and the tendency of the feature amount in each of the measurements.

In the range imaging device according to an embodiment of the present invention, the look-up table may be generated on at least any measurement condition of shape of the light pulse, emission time of the light pulse, or accumulation time during which the charge is accumulated in each of the charge accumulation units. The range image processing unit may use the look-up table corresponding to the measurement condition to determine whether the reflection light of the light pulse has been received by the pixel in a single path or the reflection light has been received by the pixel via multipath propagation.

In the range imaging device according to an embodiment of the present invention, a value of the feature amount may be calculated using, among the amounts of charge accumulated in the three or more charge accumulation units, the amount of charge accumulated in the charge accumulation unit in which the charge in accordance with the reflection light is to be accumulated.

In the range imaging device according to an embodiment of the present invention, the pixel may be provided with a first charge accumulation unit, a second charge accumulation unit, and a third charge accumulation unit. The range image processing unit may cause the charge to be accumulated in the first charge accumulation unit, the second charge accumulation unit, and the third charge accumulation unit in this order at a timing for accumulating the charge in accordance with the reflection light in at least any of the first charge accumulation unit, the second charge accumulation unit, and the third charge accumulation unit. The feature amount may be represented by a complex number with the amounts of charge accumulated in the first charge accumulation unit, the second charge accumulation unit, and the third charge accumulation unit as variables. For example, the value of the feature amount may be represented by a complex number in which a first variable that is a difference between a first charge amount in the first charge accumulation unit and a second charge amount in the second charge accumulation unit is a real part and a second variable that is a difference between the second charge amount in the second charge accumulation unit and a third charge amount in the third charge accumulation unit is an imaginary part.

In the range imaging device according to an embodiment of the present invention, a delay time by which the emission timing is delayed relative to the accumulation timing may be controlled to be different among the measurements.

In the range imaging device of the present disclosure, the range image processing unit may use a look-up table in which the relative timing relationship and the feature amount are associated with each other for the case where the reflection light has been received by the pixel in a single path to calculate an index value indicating the degree of similarity between the tendency of the look-up table and the tendency of the feature amount in each of the measurements, may determine that the reflection light has been received by the pixel in a single path if the index value does not exceed a threshold, and may determine that the reflection light has been received by the pixel via multipath propagation if the index value exceeds the threshold. The index value may be a summation of difference-normalized values in the measurements, each of the difference-normalized values being calculated by normalizing a difference between a first feature amount that is the feature amount calculated at each of the measurements and a second feature amount that is the feature amount in the look-up table corresponding to each of the measurements, by an absolute value of the second feature amount.

In the range imaging device according to an embodiment of the present invention, if the range image processing unit determines that the reflection light has been received by the pixel via multipath propagation, the range image processing unit may calculate the distance corresponding to each of light paths included in the multipath propagation by least-squares method.

The range imaging device according to an embodiment of the present invention may further include a discharging unit that discharges the charge generated by the photoelectric conversion element. The range image processing unit may repeat multiple number of times a unit accumulation process of distributing and accumulating the charge in the charge accumulation units in the pixel at a timing synchronized with the emission of the light pulse in each frame period to accumulate the charge in the charge accumulation units, and may control the discharging unit to discharge the charge generated by the photoelectric conversion element in a time interval different from a time interval during which the charge is accumulated in the charge accumulation units in the unit accumulation process.

In the range imaging device according to an embodiment of the present invention, the range image processing unit may calculate a provisional distance to the object based on a first measurement among the measurements and determine a delay time to be used for the remaining measurements among the measurements based on the provisional distance. The delay time may be a time by which the emission timing is delayed relative to the accumulation timing.

In the range imaging device according to an embodiment of the present invention, the range image processing unit may determine the delay time based on the time necessary for the light pulse to travel the provisional distance and the tendency of the feature amount.

In the range imaging device according to an embodiment of the present invention, if the provisional distance is a far distance exceeding a threshold, the range image processing unit may determine the number of accumulations with which the charge is distributed and accumulated in the charge accumulation units for the remaining measurements among the measurements, such that the number of accumulations increases as compared to the case in which the provisional distance is a short distance not exceeding the threshold.

In the range imaging device according to an embodiment of the present invention, if the range image processing unit determines that the reflection light has been received by the pixel in a single path, the range image processing unit may calculate provisional distances to the object based on measurements at the measurement timings and determine a representative value of the calculated provisional distances as indicating the distance to the object.

In the range imaging device according to an embodiment of the present invention, if the range image processing unit determines that the reflection light has been received by the pixel in a single path, the range image processing unit determines the provisional distances to the object by the least-squares method based on the measurements at the measurement timings. If the range image processing unit determines that the reflection light has been received by the pixel via multipath propagation, the range image processing unit may determine each of distances to the object by the least-squares method based on the measurements at the measurement timings.

A range imaging method according to an embodiment of the present invention is executed by a range imaging device and includes: a light source unit that emits a light pulse to a measurement space that is a space of a measurement target; a light-receiving unit that has a pixel and a pixel drive circuit, the pixel including a photoelectric conversion element generating charge in accordance with incident light and three or more charge accumulation units accumulating the charge, and the pixel drive circuit distributing and accumulating the charge in the charge accumulation units in the pixel at a timing synchronized with the emission of the light pulse; and a range image processing unit that controls an emission timing for emitting the light pulse and an accumulation timing for distributing and accumulating the charge in the charge accumulation units, and calculates the distance to an object present in the measurement space based on amounts of charge accumulated in the charge accumulation units. The range image processing unit performs multiple measurements different in relative timing relationship between the emission timing and the accumulation timing, extracts a feature amount based on the amounts of charge accumulated at the measurements, determines whether reflection light of the light pulse has been received by the pixel in a single path or the reflection light of the light pulse has been received by the pixel via multipath propagation, based on tendency of the extracted feature amount, and calculates a distance to the object present in the measurement space in accordance with a result of the determination.

According to an embodiment of the present invention, it is determined whether the pixel has received light in a single path or via multipath propagation. If it is determined that the pixel has received light in a single path, the distance to one reflecting body is calculated. If it is determined that the pixel has received light via multipath propagation, the distance to each of reflecting bodies is calculated.

Obviously, numerous modifications and variations of the present invention are possible in light of the above teachings. It is therefore to be understood that within the scope of the appended claims, the invention may be practiced otherwise than as specifically described herein.

The invention claimed is:

1. A range imaging device, comprising:

a light source configured to emit a light pulse to a measurement space of a measurement target;

a pixel drive circuit configured to distribute and accumulate charge in three or more charge accumulation circuits at a timing synchronized with emission of the light pulse, and a pixel including a photoelectric conversion element that generates the charge in accordance with incident light and the charge accumulation circuits that accumulates the charge; and circuitry configured to control an emission timing for emitting the light pulse and an accumulation timing for distributing and accumulating the charge in the charge accumulation circuits, and calculate a distance to an object in the measurement space based on amounts of charge accumulated in the charge accumulation circuits, wherein the circuitry is configured to perform a plurality of measurements different in relative timing relationship between the emission timing and the accumulation timing, extract a feature amount based on the amounts of charge accumulated at the plurality of measurements, determine, based on tendency of the extracted feature amount, whether reflection light of the light pulse is received by the pixel in a single path or the reflection light of the light pulse is received by the pixel via multipath propagation and calculate the distance to the object in the measurement space in accordance with a result of the determination, wherein the pixel is provided with a first charge accumulation circuit, a second charge accumulation circuit, and a third charge accumulation circuit, the range image processing circuit causes the charge to be accumulated in the first charge accumulation circuit, the second charge accumulation circuit, and the third charge accumulation circuit in this order at a timing for accumulating the charge in accordance with the reflection light in at least any of the first charge accumulation circuit, the second charge accumulation circuit, and the third charge accumulation circuit, and the feature amount is represented by a complex number with the amounts of charge accumulated in the first charge accumulation circuit, the second charge accumulation circuit, and the third charge accumulation circuit as variables.

2. The range imaging device according to claim 1, wherein the circuitry uses a look-up table in which the relative timing relationship and the feature amount are associated with each other for a case where the reflection light has been received by the pixel in a single path to determine whether the reflection light of the light pulse is received by the pixel in a single path or the reflection light of the light pulse has been received by the pixel via multipath propagation, based on degree of similarity between tendency of the look-up table and the tendency of the feature amount in each of the plurality of measurements.

3. The range imaging device according to claim 2, wherein the look-up table is generated on at least any measurement condition of shape of the light pulse, emission time of the light pulse, accumulation time during which the charge is accumulated in each of the charge accumulation circuits, and the circuitry uses the look-up table corresponding to the measurement condition to determine whether the reflection light of the light pulse is received by the pixel in a single path or the reflection light has been received by the pixel via multipath propagation.

4. The range imaging device according to claim 1, wherein a value of the feature amount is calculated using, among the amounts of charge accumulated in the three or more charge accumulation circuits, the amount of charge accumulated in the charge accumulation circuit in which the charge in accordance with the reflection light is to be accumulated.

5. The range imaging device according to claim 1, wherein a value of the feature amount is represented by a complex number in which a first variable that is a difference between a first charge amount in the first charge accumulation circuit and a second charge amount in the second charge accumulation circuit is a real part and a second variable that is a difference between the second charge amount in the second charge accumulation circuit and a third charge amount in the third charge accumulation circuit is an imaginary part.

6. The range imaging device according to claim 1, wherein the pixel is further provided with a fourth charge accumulation circuit, the range image processing circuit causes the charge to be accumulated in the first charge accumulation circuit, the second charge accumulation circuit, the third charge accumulation circuit, and the fourth charge accumulation circuit in this order at a timing for accumulating the charge in accordance with the reflection light in at least any of the first charge accumulation circuit, the second charge accumulation circuit, the third charge accumulation circuit, and the fourth charge accumulation circuit, and the feature amount is represented by a complex number with the amounts of charge accumulated in the first charge accumulation circuit, the second charge accumulation circuit, the third charge accumulation circuit, and the fourth charge accumulation circuit as variables.

7. The range imaging device according to claim 6, wherein a value of the feature amount is represented by a complex number in which a first variable that is a difference between a first charge amount in the first charge accumulation circuit and a third charge amount in the third charge accumulation circuit is a real part and a second variable that is a difference between a second charge amount in the second charge accumulation circuit and a fourth charge amount in the fourth charge accumulation circuit is an imaginary part.

8. The range imaging device according to claim 1, wherein a delay time by which the emission timing is delayed relative to the accumulation timing is controlled to be different among the plurality of measurements.

9. A range imaging device, comprising:

a light source configured to emit a light pulse to a measurement space of a measurement target;

a pixel drive circuit configured to distribute and accumulate charge in three or more charge accumulation circuits at a timing synchronized with emission of the light pulse, and a pixel including a photoelectric conversion element that generates the charge in accordance with incident light and the charge accumulation circuits that accumulates the charge; and circuitry configured to control an emission timing for emitting the light pulse and an accumulation timing for distributing and accumulating the charge in the charge accumulation circuits, and calculate a distance to an object in the measurement space based on amounts of charge accumulated in the charge accumulation circuits, wherein the circuitry is configured to perform a plurality of measurements different in relative timing relationship between the emission timing and the accumulation timing, extract a feature amount based on the amounts of charge accumulated at the plurality of measurements, determine, based on tendency of the extracted feature amount, whether reflection light of the light pulse is received by the pixel in a single path or the reflection light of the light pulse is received by the pixel via multipath propagation and calculate the distance to the object in the measurement space in accordance with a result of the determination, wherein the circuitry uses a look-up table in which the relative timing relationship and the feature amount are associated with each other for a case where the reflection light has been received by the pixel in a single path to calculate an index value indicating degree of similarity between tendency of the look-up table and the tendency of the feature amount in each of the plurality of measurements, determines that the reflection light has been received by the pixel in a single path if the index value does not exceed a threshold, and determines that the reflection light has been received by the pixel via multipath propagation if the index value exceeds the threshold, and the index value is a summation of difference-normalized values in the plurality of measurements, each of the difference-normalized values being calculated by normalizing a difference between a first feature amount that is the feature amount calculated at each of the plurality of measurements and a second feature amount that is the feature amount in the look-up table corresponding to each of the plurality of measurements, by an absolute value of the second feature amount.

10. The range imaging device according to claim 1, wherein if the circuitry determines that the reflection light has been received by the pixel via multipath propagation, the circuitry calculates the distance corresponding to each of light paths included in the multipath propagation by a least-squares method.

11. The range imaging device according to claim 1, further comprising:

a discharging circuit that discharges the charge generated by the photoelectric conversion element, wherein the circuitry repeats a plurality of number of times a unit accumulation process of distributing and accumulating the charge in the charge accumulation circuits in the pixel at a timing synchronized with the emission of the light pulse in each frame period to accumulate the charge in the charge accumulation circuits, and controls the discharging circuit to discharge the charge generated by the photoelectric conversion element in a time interval different from a time interval during which the charge is accumulated in the charge accumulation circuits in the unit accumulation process.

12. The range imaging device according to claim 1, wherein the circuitry calculates a provisional distance to the object based on a first measurement among the plurality of measurements and determines a delay time to be used for remaining measurements among the plurality of measurements based on the provisional distance, and the delay time is a time by which the emission timing is delayed relative to the accumulation timing.

13. The range imaging device according to claim 12, wherein the circuitry determines the delay time based on a time necessary for the light pulse to travel the provisional distance and the tendency of the feature amount.

14. The range imaging device according to claim 12, wherein if the provisional distance is a far distance exceeding a threshold, the circuitry increases number of accumulations with which the charge is distributed and accumulated in the charge accumulation circuits for the remaining measurements among the plurality of measurements, as compared to a case in which the provisional distance is a short distance not exceeding the threshold.

15. The range imaging device according to claim 1, wherein if the circuitry determines that the reflection light has been received by the pixel in a single path, the circuitry calculates provisional distances to the object based on measurements at the plurality of measurement timings and determines a representative value of the calculated provisional distances as indicating the distance to the object.

16. The range imaging device according to claim 1, wherein if the circuitry determines that the reflection light has been received by the pixel in a single path, the circuitry determines provisional distances to the object by a least-squares method based on measurements at the plurality of measurement timings, and if the circuitry determines that the reflection light has been received by the pixel via multipath propagation, the circuitry determines each of distances to the object by the least-squares method based on the measurements at the plurality of measurement timings.

17. The range imaging device according to claim 2, wherein a value of the feature amount is calculated using, among the amounts of charge accumulated in the three or more charge accumulation circuits, the amount of charge accumulated in the charge accumulation circuit in which the charge in accordance with the reflection light is to be accumulated.

18. A range imaging method executed by a range imaging device, comprising:

emitting a light pulse to a measurement space of a measurement target by a light source of the range imaging device;

generating charge in accordance with incident light by a photoelectric conversion element in a pixel in the range imaging device;

distributing and accumulating the charge in three or more charge accumulation circuits in the pixel in the range imaging device at a timing synchronized with the emission of the light pulse by a pixel drive circuit in the range imaging device; and controlling an emission timing for emitting the light pulse and an accumulation timing for distributing and accumulating the charge in the charge accumulation circuits such that a distance to an object in the measurement space is calculated based on amounts of charge accumulated in the charge accumulation circuits by circuitry of the range imaging device, wherein the controlling by the circuitry includes performing a plurality of measurements different in relative timing relationship between the emission timing and the accumulation timing, extracting a feature amount based on the amounts of charge accumulated at the plurality of measurements, determining, based on tendency of the extracted feature amount, whether reflection light of the light pulse is received by the pixel in a single path or the reflection light of the light pulse is received by the pixel via multipath propagation, and calculating the distance to the object in the measurement space in accordance with a result of the determination, wherein the pixel is provided with a first charge accumulation circuit, a second charge accumulation circuit, and a third charge accumulation circuit, the range image processing circuit causes the charge to be accumulated in the first charge accumulation circuit, the second charge accumulation circuit, and the third charge accumulation circuit in this order at a timing for accumulating the charge in accordance with the reflection light in at least any of the first charge accumulation circuit, the second charge accumulation circuit, and the third charge accumulation circuit, and the feature amount is represented by a complex number with the amounts of charge accumulated in the first charge accumulation circuit, the second charge accumulation circuit, and the third charge accumulation circuit as variables.

19. The range imaging method according to claim 18, wherein the pixel is further provided with a fourth charge accumulation circuit, the circuitry causes the charge to be accumulated in the first charge accumulation circuit, the second charge accumulation circuit, the third charge accumulation circuit, and the fourth charge accumulation circuit in this order at a timing for accumulating the charge in accordance with the reflection light in at least any of the first charge accumulation circuit, the second charge accumulation circuit, the third charge accumulation circuit, and the fourth charge accumulation circuit, and the feature amount is represented by a complex number with the amounts of charge accumulated in the first charge accumulation circuit, the second charge accumulation circuit, the third charge accumulation circuit, and the fourth charge accumulation circuit as variables.

* * * * *